US011026187B2

United States Patent
Oteri et al.

(10) Patent No.: US 11,026,187 B2
(45) Date of Patent: *Jun. 1, 2021

(54) CLEAR CHANNEL ASSESSMENT (CCA) THRESHOLD ADAPTATION METHOD

(71) Applicant: InterDigital Patent Holdings, Inc., Wilmington, DE (US)

(72) Inventors: Oghenekome Oteri, San Diego, CA (US); Pengfei Xia, San Diego, CA (US); Xiaofei Wang, Cedar Grove, NJ (US); Hanqing Lou, Syosset, NY (US); Monisha Ghosh, Chicago, IL (US); Robert L Olesen, Huntington, NY (US); Nirav B. Shah, San Diego, CA (US); Frank La Sita, Setauket, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,986

(22) Filed: Mar. 17, 2020

(65) Prior Publication Data

US 2020/0221388 A1    Jul. 9, 2020

Related U.S. Application Data

(63) Continuation of application No. 16/275,046, filed on Feb. 13, 2019, now Pat. No. 10,631,252, which is a (Continued)

(51) Int. Cl.
*H04W 52/24* (2009.01)
*H04W 74/08* (2009.01)
(Continued)

(52) U.S. Cl.
CPC ......... *H04W 52/243* (2013.01); *H04W 52/12* (2013.01); *H04W 74/0808* (2013.01); *H04W 84/12* (2013.01)

(58) Field of Classification Search
CPC . H04W 84/12; H04W 74/08; H04W 74/0808; H04W 74/0816; H04W 24/02; H04W 52/243; H04B 17/318
(Continued)

(56) References Cited

U.S. PATENT DOCUMENTS 9,338,789 B2    5/2016  Wang et al.
9,807,699 B2 *  10/2017 Oteri ................. H04W 74/0808
(Continued)

OTHER PUBLICATIONS

Chen et al., "MAC and PHY Proposal for 802.11af," IEEE 802.11-10/0258r0 (Mar. 2010).
(Continued)

*Primary Examiner* — Philip Sobutka
(74) *Attorney, Agent, or Firm* — Volpe Koenig

(57) ABSTRACT

Methods and apparatuses are described herein for determining a transmit power based on clear channel assessment (CCA) thresholds. A station (STA) associated with a first Basic Service Set (BSS) may receive, from an access point (AP) associated with the first BSS, a clear channel assessment (CCA) value for a group of STAs associated with a second BSS. The CCA value may indicate a minimum CCA threshold for a packet received from the second BSS. The STA may then determine, based on the CCA value, a STA specific CCA parameter and a target CCA parameter. The target CCA parameter may be greater than or equal to the STA specific CCA parameter. Based on the STA specific CCA parameter and the target CCA parameter, the STA may determine a target transmit power control (TPC) parameter of the STA, wherein the sum of target TPC parameter and target CCA parameter is constant.

16 Claims, 14 Drawing Sheets

Related U.S. Application Data continuation of application No. 15/797,886, filed on Oct. 30, 2017, now Pat. No. 10,225,806, which is a continuation of application No. 15/021,634, filed as application No. PCT/US2014/055445 on Sep. 12, 2014, now Pat. No. 9,807,699.

(60) Provisional application No. 61/877,699, filed on Sep. 13, 2013.

(51) Int. Cl.
 *H04W 84/12* (2009.01)
 *H04W 52/12* (2009.01)

(58) Field of Classification Search
 USPC .......................................................... 455/522
 See application file for complete search history.

(56) References Cited

U.S. PATENT DOCUMENTS

| | | | | |
|---|---|---|---|---|
| 10,225,806 | B2* | 3/2019 | Oteri | .................. H04W 52/243 |
| 10,631,252 | B2* | 4/2020 | Oteri | .................... H04W 52/12 |
| 2005/0152313 | A1 | 7/2005 | Cave et al. | |
| 2007/0072638 | A1 | 3/2007 | Yang et al. | |
| 2008/0125160 | A1 | 5/2008 | Zhu | |
| 2013/0286959 | A1 | 10/2013 | Lou et al. | |
| 2015/0319700 | A1 | 11/2015 | Oteri et al. | |
| 2016/0066349 | A1 | 3/2016 | Seok | |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D4.0 (Apr. 2013).
Haghani et al., "Adaptive Carrier-Sensing for Throughput Improvement in IEEE 802.11 Networks," IEEE Global Telecommunications Conference (Dec. 2010).
Halasz, "Sub 1 GHz license-exempt PAR and 5C," IEEE P802.11, Wireless LANs, IEEE 802.11-10/0001r13 (Jul. 2010).
Holma et al., "WCDMA for UMTS—HSPA Evolution and LTE," John Wiley & Sons, Ltd (2007).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D0.1 (May 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Jamil et al., "MAC simulation results for Dynamic sensitivity control (DSC—CCA adaptation) and transmit power control (TPC)," IEEE 802.11-14/0523r0 (Apr. 2014).
Jindal et al., "Improved Spatial Reuse Feasibility—Part II," IEEE 802.11-14/0083r0 (Jan. 2014).
Jung et al., "A Power Control MAC Protocol for Ad Hoc Networks," Proceedings of the 8th Annual International Conference on Mobile Computing and Networking, Atlanta, Georgia, pp. 36-47 (Sep. 2002).
Jung et al., "A Power Control MAC Protocol for Ad Hoc Networks," Wireless Networks, Issue 11, pp. 55-66 (2005).
Kowalik et al., "Practical Issues of Power Control in IEEE 802.11 Wireless Devices," International Conference on Telecommunications (Jun. 2008).
Kwak et al., "Support for Deferral Management in 802.11v," IEEE 802.11-05/xxx2r0 (May 2005).
Lasita et al., "Residential Scenario CCA/TPC Simulation Discussion," IEEE 802.11-14/0578r0 (May 2014).
Liu et al., "Open-Loop Link Margin Index for Fast Link Adaptation," IEEE 802.11-12/0645 (May 2012).
Ma et al., "Optimizing 802.11 Wireless Mesh Networks Based on Physical Carrier Sensing," IEEE/ACM Transactions on Networking, vol. 17, No. 5 (Oct. 2009).
Mhatre et al., "Interference Mitigation Through Power Control in High Density 802.11 WLANs," 26th IEEE International Conference on Computer Communications, pp. 535-543 (May 2007).
Mhatre et al., "Optimal design of high density 802.11 WLANs," Proceedings of the 2006 ACM CoNEXT conference (Dec. 2006).
Perahia et al., "IEEE 802.11ad Overview for CWPAN," IEEE 802.11-11/0459r0 (Mar. 2011).
Perahia et al., "Next Generation Wireless LANs, Throughput, Robustness, and Reliability in 802.11n," Cambridge University Press (2008).
Porat et al., "HEW Evaluation Methodology," IEEE P802.11 Wireless LANs, IEEE 802.11-13/1359r1 (Mar. 2014).
Porat et al., "Improved Spatial Reuse Feasibility—Part I," IEEE 802.11-14/0082r0 (Jan. 2014).
Qiao et al., "Interference Analysis and Transmit Power Control in IEEE 802.11a/h Wireless LANs," IEEE/ACM Transactions on Networking, vol. 15, No. 5 (Oct. 2007).
Schmidt et al., "Advanced Carrier Sensing to Resolve Local Channel Congestion," Proceedings of the 8th ACM International Workshop on Vehicular Inter-Networking, pp. 11-20 (Sep. 2011).
Sesia et al., "LTE, The UMTS Long Term Evolution," John Wiley & Sons, Ltd (2011).
Smith, "Dense Apartment Complex Capacity Improvements with Channel selection and Dynamic Sensitivity Control," IEEE 802.11-13/1487r1 (Nov. 2013).
Smith, "Dynamic Sensitivity Control Improvement to area throughput," IEEE 802.11-13/1012r0 (Sep. 2013).
Son et al., "Measurements on CCA Thresholds in OBSS Environment," IEEE 802.11-14/0628r0 (May 2014).
Taneja, "Advanced Engineering Mathematics, vol. 2," I.K. International Publishing House Pvt. Ltd. (2008).
Zhou et al., "Balancing the Hidden and Exposed Node Problems with Power Control in CSMA/CA-Based Wireless Networks," IEEE Wireless Communications and Networking Conference (Mar. 2005).

\* cited by examiner

| ELEMENT ID /701 | LENGTH /702 | TPC CAPABILITIES /703 | CCA CAPABILITIES /704 |
|---|---|---|---|

CLEAR CHANNEL ASSESSMENT (CCA) THRESHOLD ADAPTATION METHOD

CROSS REFERENCE TO RELATED APPLICATIONS

This application is a continuation of U.S. patent application Ser. No. 16/275,046 filed Feb. 13, 2019, which is a continuation of U.S. patent application Ser. No. 15/797,886 filed on Oct. 30, 2017, which issued as U.S. Pat. No. 10,225,806 on Mar. 5, 2019, which is a continuation of U.S. patent application Ser. No. 15/021,634 filed on Mar. 11, 2016, which issued as U.S. Pat. No. 9,807,699 on Oct. 31, 2017, which is a U.S. National Stage, under 35 U.S.C. § 371, of International Application No. PCT/US2014/055445 filed on Sep. 12, 2014, which claims the benefit of U.S. Provisional Application Ser. No. 61/877,699 filed Sep. 13, 2013, the contents of which are hereby incorporated by reference herein.

BACKGROUND

Institute of Electrical and Electronics Engineers (IEEE) 802.11 WLAN networks are increasingly being deployed in dense environments. Multiple Access Points (APs) and Basic Service Sets (BSSs) are common to dense environments. Adjacent APs may choose different frequency bands of operation when possible. However, when different frequency bands are not available, two or more adjacent APs may use the same frequency bands. When two or more adjacent APs use the same frequency bands, interference may result, especially for stations (STAs) on the edge of coverage.

Transmit Power Control (TPC) in a wireless network may be used for a variety of reasons. These reasons may include minimizing interference between nodes, improving wireless link quality, reducing energy consumption, controlling the topology, reducing interference with satellites/radar, or improving coverage in the network. Clear Channel Assessment (CCA) thresholds may be used by STAs to decide whether a channel is available for use or not. Improved methods of estimating these parameters to maximize a desired metric in 802.11 WLAN networks are needed.

SUMMARY

Methods and apparatuses are described herein for adapting clear channel assessment (CCA) thresholds with or without Transmit Power Control (TPC) are disclosed. An IEEE 802.11 station (STA) may dynamically calculate a STA specific transmit power control (TPC) value and a STA specific clear channel assessment (CCA) value based on a target TPC parameter and a target CCA parameter. The target TPC parameter and the target CCA parameter may be received from an IEEE 802.11 cluster head configured to control TPC and CCA for a plurality of STAs associated with the BSS. The target TPC parameter and the target CCA parameter also may be related. The STA may then determine whether a carrier sense multiple access (CSMA) wireless medium of a wireless local area network (WLAN) basic service set (BSS) is occupied or idle based on the STA specific CCA value.

BRIEF DESCRIPTION OF THE DRAWINGS

A more detailed understanding may be had from the following description, given by way of example in conjunction with the accompanying drawings wherein:

FIG. 7 is an illustration of an example design of an Extended Power Capability Element;

FIG. 10 is a flow diagram for an example procedure for TPC/CCA adaptations such that all STAs within the same BSS use a common transmit power and/or a common CCA threshold.

DETAILED DESCRIPTION

Figure 1A:
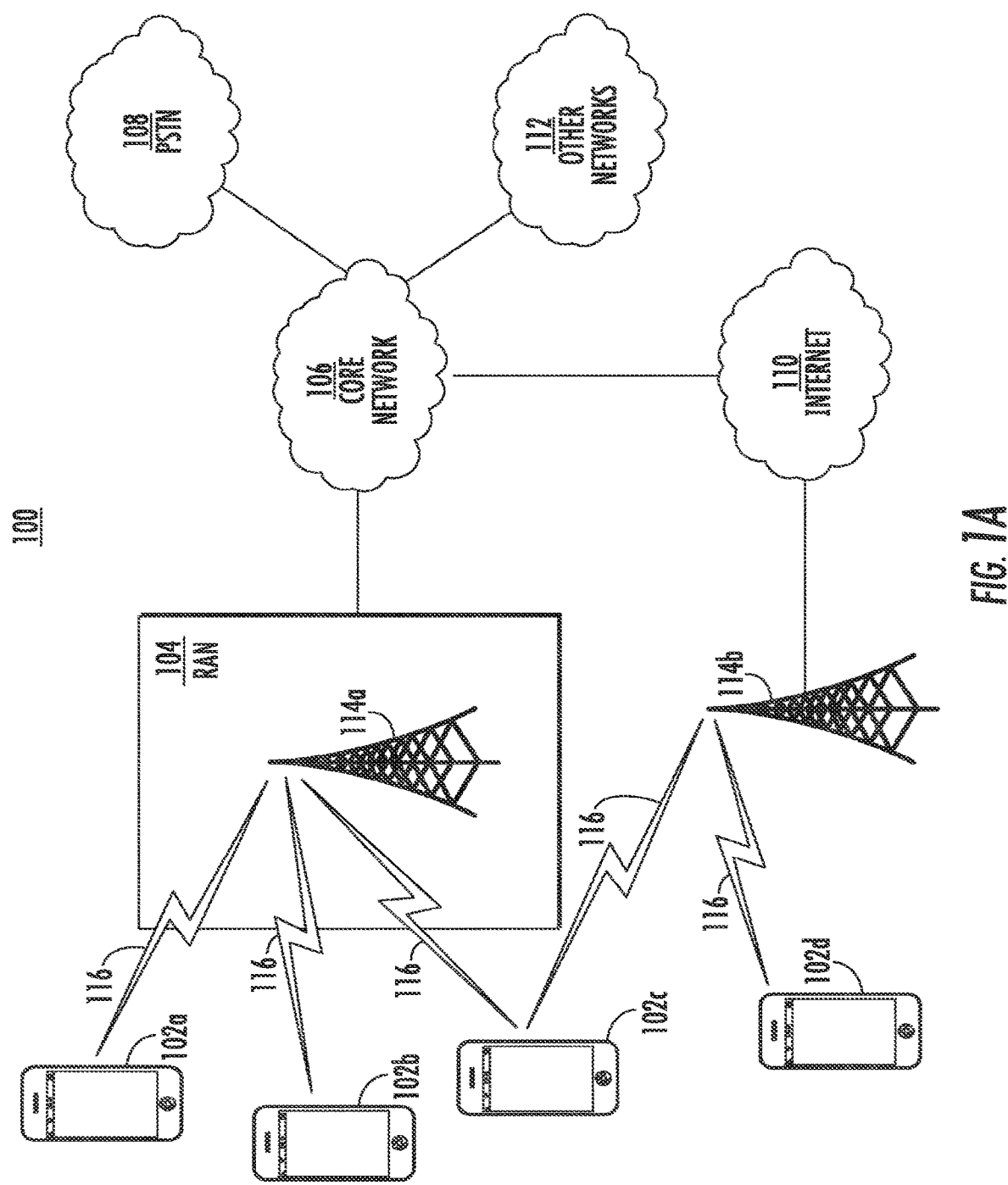
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
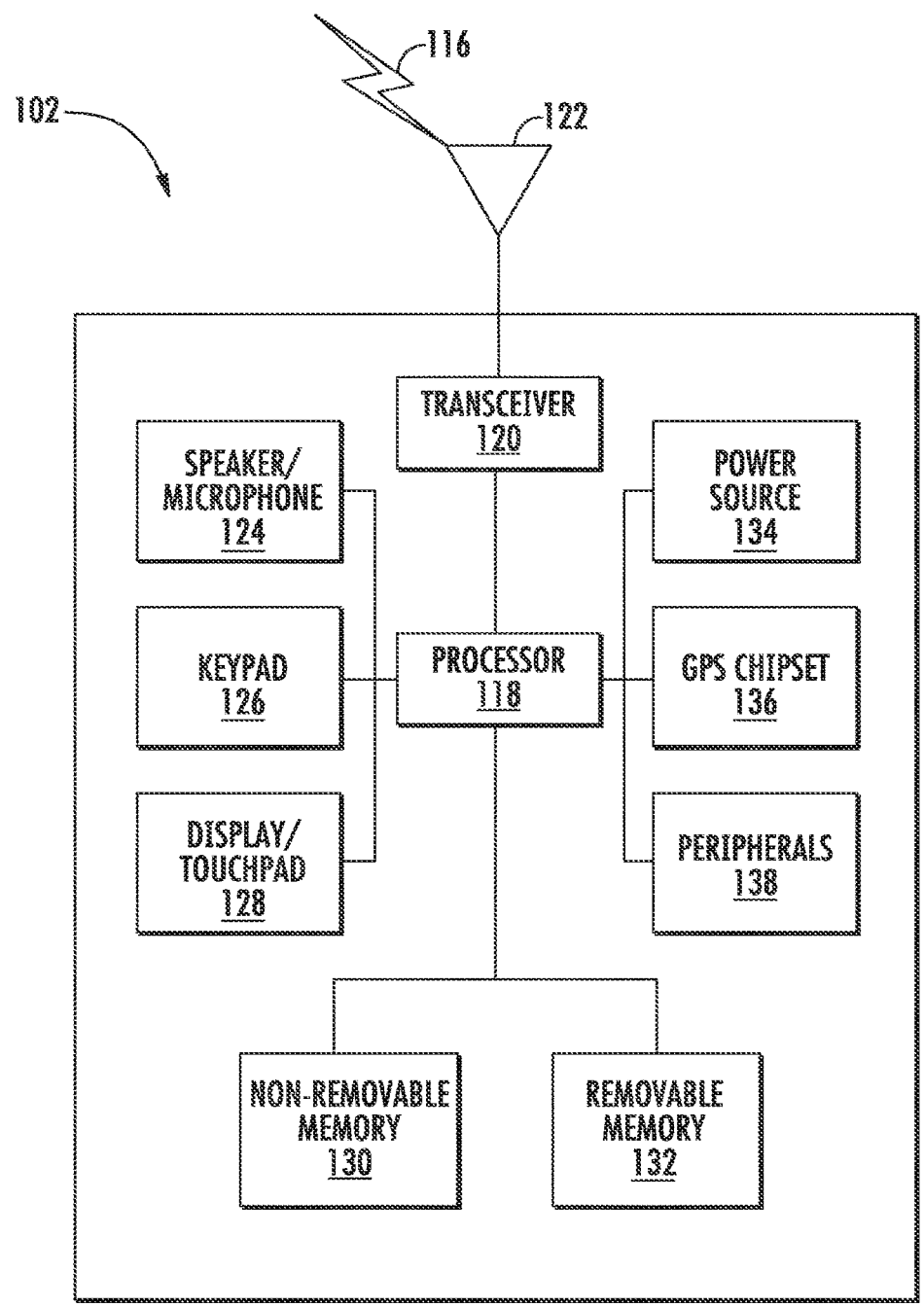
FIG. 1B is a system diagram of an example wireless transmit/receive unit (WTRU) that may be used within the communications system illustrated in FIG. 1A.
Figure 1C:
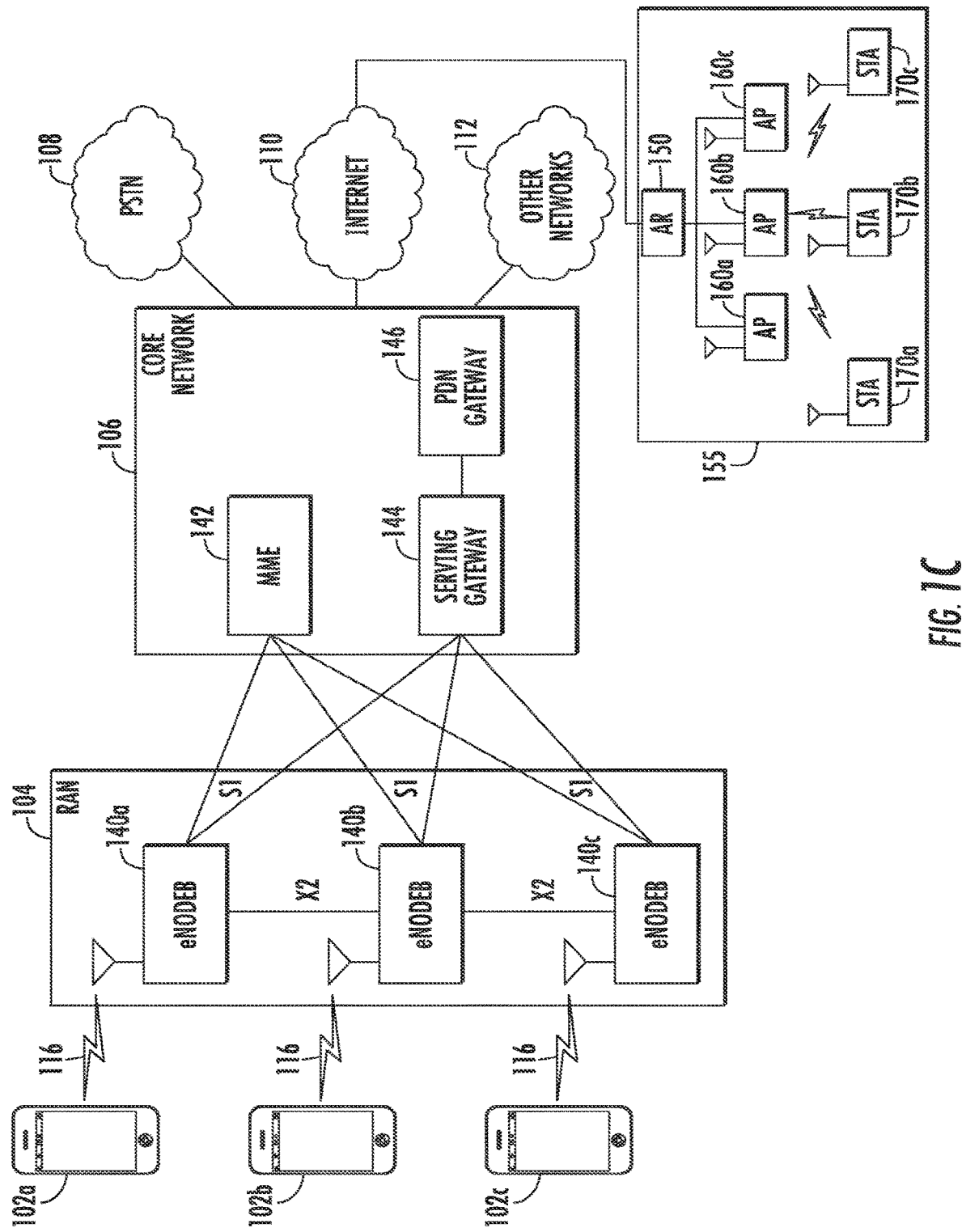

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10:
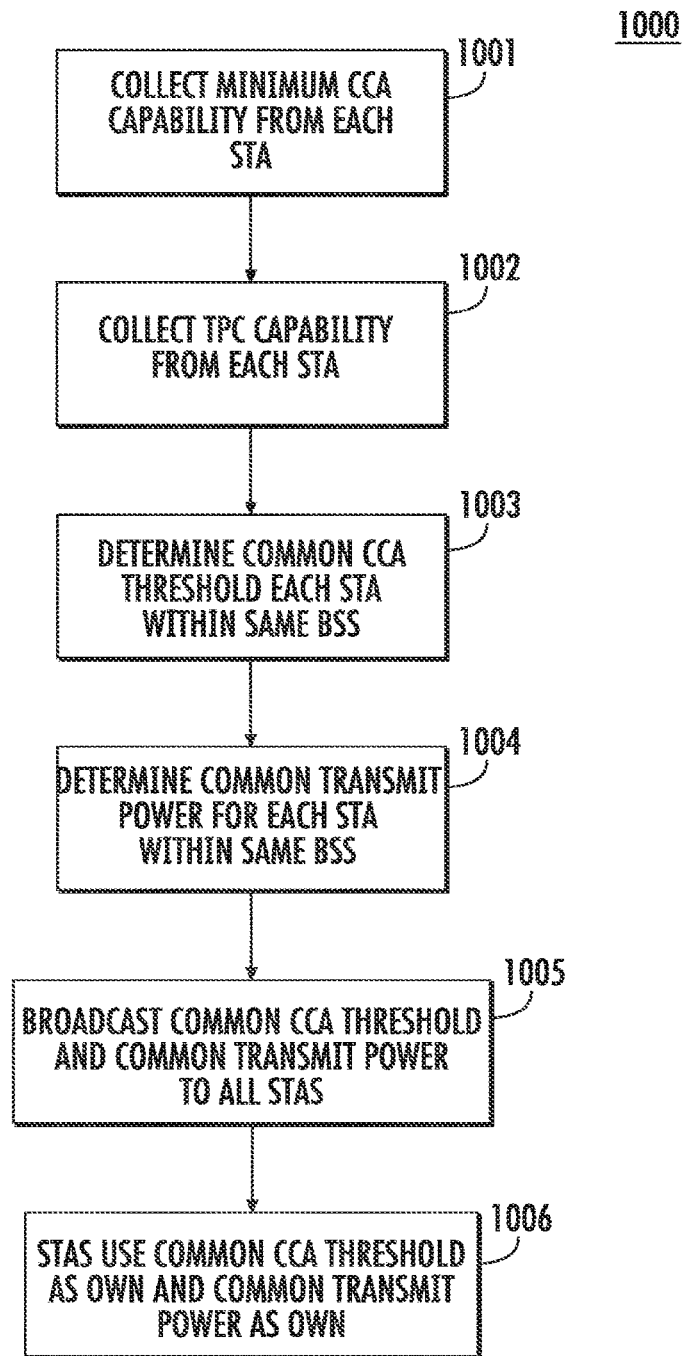
FIG. 10 is a system diagram of an example radio access network and an example core network that may be used within the communications system illustrated in FIG. 1A.

FIG. 10 is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 10, the eNode-Bs 140a, 140b, 140c may communicate with one another over an X2 interface.

The core network 106 shown in FIG. 10 may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A WLAN in Infrastructure Basic Service Set (BSS) mode has an AP for the BSS and one or more STAs associated with the AP. The AP may have access or may interface to a Distribution System (DS) or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP where the source STA sends traffic to the AP, and the AP delivers the traffic to the destination STA. Such traffic between STAs within a BSS may be peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode may have no AP, and/or STAs, communicating directly with each other. This mode of communication may be referred to as an "ad-hoc" mode of communication.

Using the 802.11ac infrastructure mode of operation, the AP may transmit a beacon on a fixed channel. The fixed channel may be the primary channel. This channel may be 20 MHz wide and may be the operating channel of the BSS. This channel may also be used by the STAs to establish a connection with the AP. The fundamental channel access mechanism in an 802.11 system may be Carrier Sense Multiple Access with Collision Avoidance (CSMA/CA). In this mode of operation, every STA, including the AP, may sense the primary channel. If the channel is detected to be busy, the STA may back off. Therefore, only one STA may transmit at any given time in a given BSS.

In 802.11n, High Throughput (HT) STAs may also use a 40 MHz wide channel for communication. This may be achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz and 80 MHz channels may be formed by combining contiguous 20 MHz channels similar to 802.11n. A 160 MHz channel may also be formed. For example, a 160 MHz channel may be formed by combining 8 contiguous 20 MHz channels, or by combining two non-contiguous 80 MHz channels. The combination of two, non-contiguous 80 MHz channels may also be referred to as an 80+80 configuration. For the 80+80 configuration, the data, after channel encoding, may be passed through a segment parser that may divide it into two streams. IFFT and time domain processing may be done on each stream separately. The streams may then be mapped on to the two channels, and the data may be transmitted. At the receiver, this mechanism may be reversed, and the combined data may be sent to the MAC.

Sub 1 GHz modes of operation may be supported by 802.11af and 802.11ah. For these specifications, the channel operating bandwidths and carriers may be reduced relative to those used in 802.11n and 802.11ac. 802.11af may support 5 MHz, 10 MHz and 20 MHz bandwidths in the TV White Space (TVWS) spectrum, and 802.11ah may support 1 MHz, 2 MHz, 4 MHz, 8 MHz, and 16 MHz bandwidths using non-TVWS spectrum. A possible use for 802.11ah may be support for Meter Type Control (MTC) devices in a macro coverage area. MTC devices may have limited capabilities including support for limited bandwidths and a requirement for extensive battery life.

WLAN systems supporting multiple channels and channel widths, such as 802.11n, 802.11ac, 802.11af, and 802.11ah, may include a channel designated as the primary channel. The primary channel may, but not necessarily, have a bandwidth equal to the largest common operating bandwidth supported by all STAs in the BSS. Therefore, the bandwidth of the primary channel may be limited by the STA, or all STAs operating in a BSS, which may support the smallest bandwidth operating mode. In the example of 802.11ah, the primary channel may be 1 MHz wide if there are STAs that only support a 1 MHz mode even if the AP, and other STAs in the BSS, may support a 2 MHz, 4 MHz, 8 MHz, 16 MHz, or other channel bandwidth operating modes. All carrier sensing, and NAV settings may depend on the status of the primary channel. For example, if the primary channel is busy due to a STA supporting only a 1 MHz operating mode that is transmitting to the AP, then the entire available frequency bands may be considered busy even though a majority of the frequency bands stays idle and available.

In the United States, the available frequency bands which may be used by 802.11ah may be from 902 MHz to 928 MHz. In Korea, the available frequency bands which may be used by 802.11ah may be from 917.5 MHz to 923.5 MHz.

In Japan, the available frequency bands which may be used by 802.11ah may be from 916.5 MHz to 927.5 MHz. The total bandwidth available for 802.11ah may be 6 MHz to 26 MHz depending on the country code.

Uses for Transmit Power Control (TPC) in a wireless network may include, but are not limited to, minimizing interference between nodes, improving wireless link quality, reducing energy consumption, controlling the topology, reducing interference with satellites/radar in 5 GHz mode, and improving coverage in the network. Existing cellular standards may have different methods of implementing TPC. For example, in WCDMA and HSPA, TPC may be a combination of open loop power control, outer loop power control, and inner loop power control. Due to the near-far problem caused by a multiple access scheme (e.g. Code Division Multiple Access (CDMA)), this implementation may be used to ensure that the power at the receiver in the uplink is equal for all WTRUs associated with the NodeB, eNodeB, or base station (BS). As all WTRUs utilize the entire spectrum, the received power of STAs far away from the BS may be overwhelmed by those close to the BS if the transmit power of the different WTRUs is not managed.

In open loop power control, which may occur for example between the WTRU and the Radio Network Controller (RNC), each WTRU transmitter may set its output power to a specific value to compensate for the path loss. This power control may set the initial uplink and downlink transmission powers when a WTRU is accessing the network.

Outer loop power control, which also occurs between the WTRU and the RNC, may be used to compensate for long-term channel variations. This type of power control may be used to maintain the quality of communication at a level of bearer service quality required, while using the lowest power as possible. Uplink outer loop power control may be responsible for setting a target Signal to Interference Ratio (SIR) in the NodeB or eNodeB for each individual uplink inner loop power control. It may be updated for each WTRU according to the block error rate (BLER) or bit error rate (BER) for each Radio Resource Control (RRC) connection at a frequency between 10 Hz and 100 Hz. Downlink outer loop power control may enable the WTRU receiver to converge to a required link quality (e.g. required BLER), which may be set by the network (RNC) or eNodeB in the downlink.

Inner loop power control, which occurs between the WTRU and Node B or eNodeB, may also be referred to as fast closed loop power control. In the inner loop power control, each WTRU may compensate for short term channel variations. It may be updated at 1500 Hz. In the uplink, the WTRU transmitter may adjust its output power in accordance with one or more TPC commands received on a downlink signal from the BS, to keep the received uplink SIR at a desired SIR target.

In the uplink of an LTE system, for example, power control may be a combination of a basic open loop TPC, a dynamic closed loop TPC, and a bandwidth factor compensation component. The effective transmit power may be described as:

$$Tx\ power = P\_0 + alpha * PL + delta\_TF + f(delta\_TPC) + 10 \log 10(M) \qquad \text{Equation (1)}$$

Because LTE may use Single-Carrier Frequency Division Multiple Access (SC-FDMA) in the uplink, there may not be a need for tight power control. Basic open loop TPC may implement fractional power control in which the WTRU may compensate for a fraction of the path loss experienced:

$$Tx\_power = P\_0 + alpha * PL \qquad \text{Equation (2)}$$

where alpha may be the fractional path loss compensation parameter. The parameter, P_0, may be a WTRU specific offset component that enables the eNodeB to correct for systematic offsets in the transmit power of the WTRU. The PL parameter may be an estimate by the WTRU of the path loss derived from the Received Signal Received Power (RSRP) and the eNodeB transmit power while alpha may trade off fairness for cell capacity. The PL parameter may be set between 0.7 and 0.8 and may reduce the effect of the cell edge transmissions, thereby increasing system capacity while minimizing the impact on cell edge performance. It may be used on the Physical Uplink Shared Channel (PUSCH). The Physical Uplink Control CHannel (PUCCH) may set alpha to 1 and may have a different value of P_0.

Closed loop power control may be dynamic and may perform interference control and channel condition adaptation. It may comprise the terms delta_TF+f(delta_TPC). The parameter delta_TF may be a modulation and coding scheme (MCS) dependent parameter that may be based on the Shannon Capacity theorem. The WTRU specific parameter, f(delta_TPC), may be similar to the closed loop TPC term in WCDMA/HSPA and may instruct the WTRU to increase or decrease its power based on the power received at the eNodeB. The bandwidth factor may be a factor 10 log 10(M) that scales the transmit power based on a number of resource blocks (RBs) actually scheduled.

The TPC requirements for WLANs may be different from cellular systems for various reasons, including but not limited to the following:

(1) For example, in a CDMA system, a near-far problem may be created where a WTRU close to the base station and another WTRU far away from the base station may be transmitting simultaneously. In an 802.11 WLAN using a time domain system, there would be only one STA transmitting within a BSS at a time, which may reduce the need for tight closed loop power control.

(2) In the example of an LTE system, there may be a central scheduler controlling the multiple access algorithm. However, in an IEEE 802.11 WLAN, the primary multiple access algorithm may be distributed in the Distributed Coordination Function (DCF) or the Enhanced Distribution Channel Access (EDCA) multiple access method. Therefore, the need to balance uplink scheduling of cell edge WTRUs against total cell capacity and explicit fractional path loss compensation may not be as important. In addition, Orthogonal Frequency Domain Multiple Access (OFDMA) is not used, and each STA/AP may occupy the entire bandwidth. As such, there may not be a need for a bandwidth factor.

(3) Additionally, the IEEE 802.11 standards body emphasizes simplicity in algorithms with receivers providing TPC recommendations and each transmitter deciding its specific transmit power based on the manufacturer's own implementation concerns and regulatory requirements.

For the above reasons, WLAN systems may specify different TPC procedures relative to the cellular-based TPC procedures described herein. Current TPC procedures in the IEEE 802.11 WLAN specifications may support the following:

(1) Association of STAs with an AP in a BSS based on the power capability of the STA.

(2) Peering of mesh STAs based on the power capability of the mesh STAs.

(3) Specification of regulatory and local, maximum transmit power levels for a current channel.

(4) Selection of transmit power for each transmission in a channel within constraints imposed by regulatory and local requirements.

(5) Adaptation of transmit power based on a several information elements including, but not limited to, path loss and link margin estimates.

As used in the embodiments described herein, directional multi-gigabit WLAN transmission is defined as WLAN transmission that is specified by IEEE 802.11ad using directional millimeter wave (mmW) transmission. WLAN transmission governed by all other specifications, such as IEEE 802.11-2012, IEEE 802.11ac, IEEE 802.11af, and IEEE 802.11ah, is defined as non-directional IEEE 802.11 WLAN transmission.

In non-directional IEEE 802.11 WLAN transmission, the receiving STA may send out a TPC Report element that includes the transmit power and link margin. The link margin may be the ratio of the received power to that required by the STA to close the link. The transmitter may use the information received in the TPC Report to decide on the transmit power. The STA may use any criteria to dynamically adapt the transmit power to another STA based on information it receives via feedback from STAs. The specific methods used may be implementation dependent. Such a procedure may considered open loop TPC, which implies that the AP, or non-STA, transmitter may determine its transmit power independently from the STAs' procedures.

A TPC report may be solicited by the receiver in which an explicit TPC Request Frame may be sent by the transmitter. Alternatively, a TPC Report may be unsolicited, for example, an AP in a BSS or a STA in an IBSS.

Using directional multi-gigabit IEEE 802.11 WLAN transmission modes, the Directional Multi-Gigabit (DMG) Link Margin element may contain a field that recommends an increase or a decrease in transmit power. In this case, the transmitter may send a DMG Link Adaptation acknowledgement to indicate whether or not it will implement the recommendation.

The Clear Channel Assessment (CCA) threshold may be used by STAs to decide whether a channel is available for use or not. If TPC is implemented in a BSS, then the CCA threshold may need to be adjusted for each STA accordingly as well so as not to impact coverage. Alternatively, the CCA threshold may be adjusted to improve system performance without the need for TPC.

Optimization methods may be used to estimate a network wide CCA threshold that maximizes the throughput coverage of a cell for a fixed cell radius and to find the cell radius required to support a desired data rate at the cell edge. An optimal rate CCA adaptation algorithm based on the network measurements may then be used.

The optimization methods may be extended to adapt both the CCA threshold and transmit power for all APs in a cell. The CCA threshold may differ between cells based on the assumption that the product of the optimal transmit power level and a linear function of the CCA_threshold for each node in the BSS (and all BSSs in the network) are constant. This algorithm may incorporate discrete rate adaptation and use a distributed algorithm based on a Gibbs sampler.

The methods and apparatuses described in the embodiments herein may be used in IEEE 802.11 WLAN networks deployed in dense environments that include multiple APs and BSSs. In such dense environments, when two or more adjacent APs use the same frequency bands, interference may become a problem, especially for STAs on the edge of coverage. The CCA threshold of the APs/STAs in the network may be estimated with or without estimating the transmit power used. Methods to estimate these parameters to maximize a desired metric are disclosed herein.

Figure 2A:
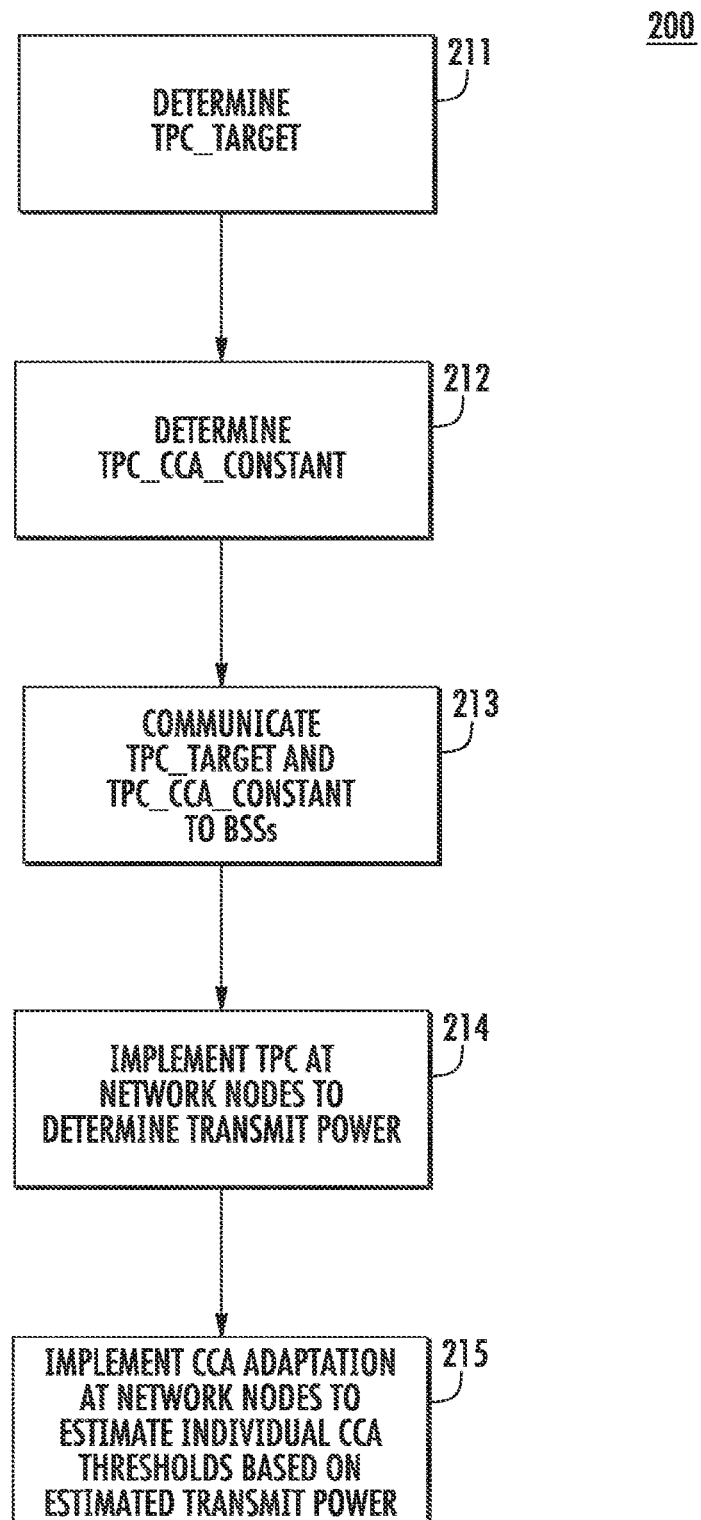
FIG. 2A is a flow chart of an example procedure wherein each node in a network may estimate an individual transmit power and a corresponding CCA threshold to maximize performance of the network.

FIG. 2A is a flow chart of an example procedure 200 wherein each node in a network may estimate an individual transmit power and a corresponding CCA threshold to maximize performance of the network in accordance with a first embodiment, which may be used in combination with any of the embodiments described herein. In this example, parameters may be adapted to obtain optimal network performance. This procedure may be implemented by a network node or other wireless device capable of operating in a wireless communications network including but not limited to a WTRU, AP, BS, STA, or UE. In this example, it is assumed that the sum in the logarithmic domain (or equivalently the product in the linear domain) of the optimal power transmit power level and CCA_threshold for each node in the BSS (and all BSSs in the network) is a constant:

$$P \text{ (dBm)} + \text{CCA\_threshold (dBm)} = \text{TPC\_CCA\_constant} \quad \text{Equation (3)}$$

Or equivalently $$P * \text{CCA\_threshold} = \text{TPC\_CCA\_constant (in linear units)} \quad \text{Equation (4)}$$

By applying the procedure of FIG. 2A, a network may adapt a common transmit power control target (TPC_target) and a common constant (TPC_CCA_constant) across the entire network in order to maximize a desired metric, which may include for example, the cell edge throughput, the overall network throughput, or the number of STAs able to make successful transmissions in the network, also referred to herein as network fairness. Alternatively, the TPC_target and TPC_CCA_constant may be adapted across a desired network cluster made up a subset of BSSs in the network.

The example procedure of FIG. 2A may be performed by an elected BSS or network controller, which may estimate the parameters and then communicate them to the BSSs in the network. Each BSS may then communicate the parameters to its STAs. As used herein, the term parameter estimator may define the entity in the network that estimates parameters, including for example, the TPC_target, the TPC_CCA_constant, the CCA values, or target CCA parameters.

Referring to FIG. 2A, the parameter estimator may determine a TPC_target 211. The TPC_target may be based on including but not limited to the following:

(1) The TPC_target used may be the minimum required received power for the lowest MCS desired by the network to achieve a desired packet error rate. This MCS may be any in the specification including the MCS used for physical layer convergence protocol (PLOP) header modulation. This may be the receiver sensitivity and may be based on the receiver's estimate of the interference at its location as well as the quality of the receiver implementation.

(2) Alternatively, the TPC_target may be the minimum required signal to interference plus noise ratio (SINR) for the lowest MCS desired by the network to achieve a desired packet error rate. Again, this MCS may be any in the specification including the lowest used for the PLOP header modulation. In this case, each BSS may broadcast its estimated interference to enable the STAs to estimate the desired power. Each STA may have to periodically transmit the interference it experiences to the AP to enable the AP estimate the desired power.

(3) The TPC_target also may be a transmit power based on a desired packet error rate. In this case, a receiver may request a transmit power increase or decrease based on the number of packet errors (or the number of PLOP header decoding errors). The TPC_target may be the target for all the STAs in the BSS or for the edge STAs in the BSS. In the latter case, the non-edge STAs may adjust their TPC_target based on the network TPC_target, their location in the network, and/or their desired modulation and coding rate. The edge STAs may use the network TPC_target and may be transmitting using the lowest modulation and coding rate.

The parameter estimator may also determine a desired TPC_CCA_constant 212. The value of the TPC_CCA_constant may be determined based on a baseline transmit power and CCA threshold. For example, this value may be based on the maximum transmit power permitted by the IEEE 802.11 specification (20 dBm) and the CCA thresholds permitted by the IEEE 802.11 specification (−82 dBm):

$$TPC\_CCA\_constant=-62\ dBm \qquad \text{Equation (5)}$$

The TPC_target and TPC_CCA_constant determined by the parameter estimator may be common for the entire network or specific to each BSS. The parameter estimator may then communicate the TPC_target and TPC_CCA_constant parameters 213 to the BSSs.

Transmit power control may then be implemented 214 at the network nodes and other wireless devices in the network, including but not limited to WTRUs, APs, and/or STAs, to determine transmit power. Note that once the individual transmit powers have been selected, each node may modify its CCA threshold based on its estimated transmit power and the TPC_CCA_constant. The node may also use adaptive modulation and coding techniques to adjust its transmit MCS to maximize its individual throughput.

For example, multiple loop TPC may be implemented. In this example, STA_i in BSS_j may estimate the transmit power for the TPC_target. When the TPC_target is the power required at the receiver:

$$P\_i\_1 + Path\_shadow\_fading\_loss\ (AP\ or\ specific\ STA)=TPC\_target \qquad \text{Equation (6)}$$

$$P\_i\_2 + Path\_shadow\_fading\_loss\ (farthest\ STA)=TPC\_target \qquad \text{Equation (7)}$$

where the farthest AP/STA may be the AP/STA that is farthest from the STA in question and needs the most power, for example in a non-infrastructure network. In the case of a STA that may be transmitting using MCS_k, STA_i in BSS_j may estimate its transmit power using the TPC_target and an MCS_bias $$P\_i + Path\_shadow\_fading\_loss = TPC\_target + MCS\_bias \qquad \text{Equation (8)}$$

AP_j in BSS_j may estimate the transmit power needed. In multi-loop TPC, a transmit power, P_j_1, may be estimated for frames intended for a specific STA while a different transmit power, P_j_2, may be estimated for frames intended for all the STAs, for example, the beacon. For example, $$P\_j\_1 + Path\_shadow\_fading\_loss\ (specific\_STA)=TPC\_target \qquad \text{Equation (9)}$$

$$P\_j\_2 + Path\_shadow\_fading\_loss\ (farthest\_STA)=TPC\_target \qquad \text{Equation (10)}$$

where the farthest STA may be the STA that is farthest from the AP and may need the most power. Adapting the "network power" to this STA may ensure that the frame is received by all STAs in the BSS. Note that fractional path loss compensation based TPC may also be used.

Alternatively, an MCS specific Open Loop Link Margin Index may be used for open loop power control, as in an 802.11ah system, to estimate the power for both APs and STAs. In this case, the margin or difference between the transmit power required to ensure successful decoding at the receiver for a desired MCS and the actual transmit power may be sent from the receiver to the transmitter. The transmitter may reduce its transmit power by this amount and may close the link. It may implicitly include the sensitivity of the receiver at the desired MCS. Note that 802.11ah defines a link margin specific to MCS0, while in this embodiment, the margin may be sent for any desired MCS. An additional field may be added to the open loop link margin index frame to indicate the MCS the margin is specified for. The individual link margins may be derived from the minimum required received power broadcast by the network.

The transmit power used by the STA/AP may also be a filtered version of the estimated instantaneous transmit power and the transmit power estimated at earlier periods. For example, the power used may be estimated by a unit norm, single pole IIR filter of the form:

$$y(n)=a\ y(n-1)+(1-a)x(n) \qquad \text{Equation (11)}$$

where y(n) may be the transmit power, y(n−1) may be the transmit power used in earlier transmissions, and x(n) may be the instantaneous power needed.

In another example, the TPC_target used may be different for each STA/AP and/or may be different for uplink and downlink transmissions for a single AP/STA. In yet another example, an SINR target may be used in the place of a TPC target where the SINR target is the SINR required for a specific MCS. Given an SINR target and an estimate of the noise or interference at the receiver, for example, the CCA threshold at the receiver or the receiver sensitivity, the transmitter may be able to estimate a TPC target and as such a desired transmit power.

Note that the time interval (or packet interval) at which the transmit power may be updated may be parameterized. In this case, the transmit power may be updated when any packet is transmitted or may be transmitted at, for example, a beacon interval. The interval may be set up by the parameter estimator for the entire network or for each BSS in the network.

CCA adaptation may then be implemented 215 at the network nodes or other wireless devices capable of operating in a wireless communications network including but not limited to WTRUs, APs, BSs, STAs, or UEs, to estimate individual CCA thresholds based on the estimated transmit power or link margin index. In one example, STA_i in BSS_j may estimate its new CCA threshold:

$$CCA\_threshold\_i\_1=TPC\_CCA\_constant-P\_i\_1 \qquad \text{Equation (12)}$$

$$CCA\_threshold\_i\_2=TPC\_CCA\_constant-P\_i\_2 \qquad \text{Equation (13)}$$

AP_j in BSS_j may estimate the new CCA threshold(s) needed:

$$CCA\_threshold\_j\_1=TPC\_CCA\_constant-P\_j\_1 \qquad \text{Equation (14)}$$

$$CCA\_threshold\_j\_2=TPC\_CCA\_constant-P\_j\_2 \qquad \text{Equation (15)}$$

Note that the AP may simply use the most restrictive CCA threshold during channel access i.e. CCA_threshold_j_2.

The node may estimate, by itself, or receive, from a central controller or cluster head, a CCA threshold margin derived from the transmit power or link margin index to be used.

The network or parameter estimator may at desired intervals update the TPC_target and/or TPC_CCA_constant to obtain the best parameters for the network using the example procedure of FIG. 2A.

Figure 2B:
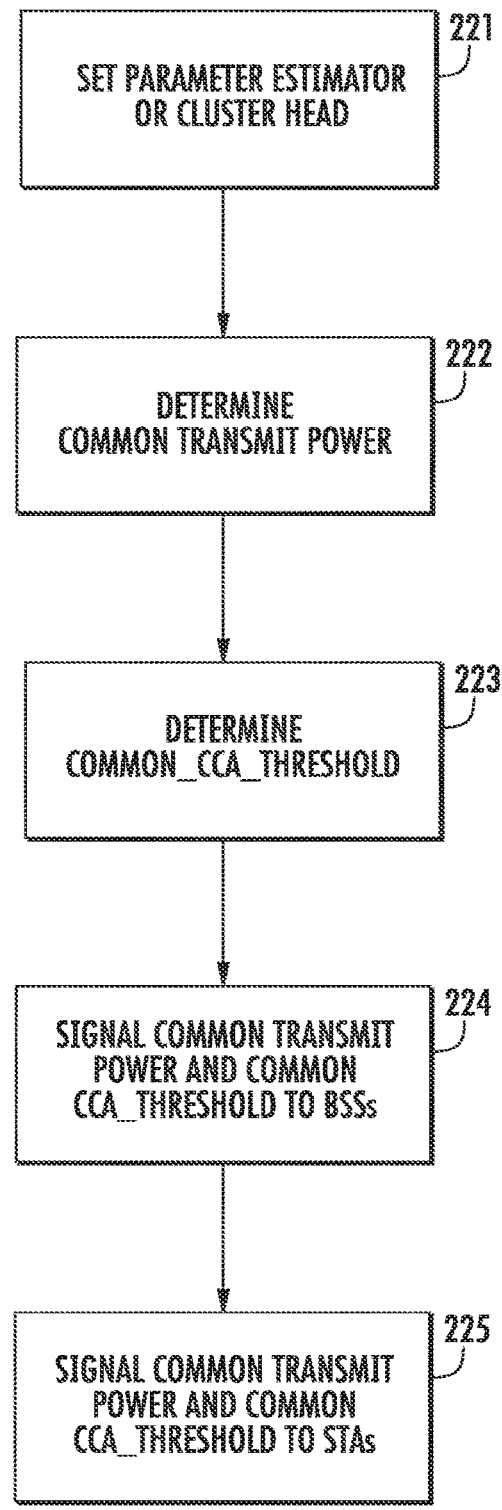
FIG. 2B is a flow chart of another example procedure wherein each node in a network may use a common transmit power and a corresponding common CCA threshold to maximize performance of the network.

FIG. 2B is a flow chart of another example procedure wherein each node in a network or other wireless device capable of operating in a wireless communications network including but not limited to WTRU, AP, BS, STA, or UE may use a common transmit power and a corresponding common CCA threshold to maximize performance of the network in accordance with another aspect of the first embodiment, which may be used in combination with any of the embodiments described herein. Adapting the common CCA_threshold and/or the common transmit power level may enable the network to maximize a desired metric, for example, the cell edge throughput, the overall network throughput, or the number of STAs able to make successful transmissions in the network, also referred to as network fairness.

Referring to FIG. 2B, a parameter estimator or cluster head may be set 221, which may be done by a number of methods, including but not limited to the following:

(1) The parameter estimator may be a cluster head that is assigned to a cluster of BSSs or an ESS. The cluster of BSSs may then be able to obtain network parameters from the cluster head that evaluates the performance of the network and indicates the values of the TPC_target and the TPC_CCA_constant to be used by the network. Alternatively, the TPC_target and TPC_CCA constant may be transmitted to all APs in an ESS using a network controller.

(2) The cluster head may be set statically during network deployment or dynamically by a central network controller.

(3) The cluster head may also be set up by a distributed algorithm that estimates the most central AP in a cluster of APs. On setup of the network, each AP may estimate the number of neighboring APs and their directionality. The directionality may be estimated using methods including but not limited to the following:

(a) Direction-of-arrival estimation.

(b) Requesting the coordinates, for example GPS location, of each neighboring AP or having each AP broadcast its position periodically.

(c) Received interference estimation within sectorized antennas, for example, as in this case, the sector that receives the most interference from a neighboring AP indicates its directionality. Each AP may then estimate a utility function based on the number and directionality of its neighbors. For example, the mean angular direction of the neighboring APs may be used where the directions range between −180 degrees and 180 degrees, or −π and +π. A central AP would find its mean tending to zero.

Each AP may broadcast this metric and its address. The AP with the lowest metric may be elected as the cluster head.

Alternatively, in another method, any random AP may elect itself as the cluster head if there is no cluster head elected. All other APs may then accept the AP as the cluster head. Note that it may be necessary for STAs located at the edge to re-broadcast or relay the cluster head address in the case that APs are far away enough not to overhear each other.

The parameter estimator or cluster head may then determine and control the common transmit power 222. The parameter estimator or cluster head may then determine the common CCA_threshold 223. Next, the parameter estimator or cluster head may signal the determined common transmit power and/or common CCA_threshold to the BSSs or to a desired network cluster made up of a set of BSSs in the network 224. The common transmit power and/or common CCA_threshold may be signaled to the BSSs using a CC modification element. Each BSS may then signal the parameters to its STAs 225. As a result, the desired CCA_threshold and/or transmit power may be common for the entire network or specific to each BSS but common to the STAs within the BSS.

The network may at desired intervals update the TPC_target and/or TPC_CCA_constant to obtain the best parameters for the network by using the procedure of FIG. 2B.

STAs may also retransmit the CCA modification element so that it may be overheard by neighboring STAs/APs or neighboring BSSs and propagate through the network. For example, AP1 may be set up as the cluster head and may broadcasts this information in its beacon. The information may be overheard by all STAs in BSS1 as well as some STAs in BSS2. AP2 in BSS2 may broadcast a cluster head request as it may be too far away from AP1 to overhear the cluster head announcement and/or the CCA modification frame. STAx in BSS1 may then transmit the CCA modification element either in response to the cluster head announcement from AP2 or in response to a change in the values of the TPC_target or TPC_CCA_constant from AP1. On receipt of the new values, the APs may restart the procedure to re-estimate the transmit power for the APs/STAs and the corresponding CCA thresholds. The TPC_target and TPC_CCA_constant may be set independently for the uplink and downlink transmissions.

Figure 2C:
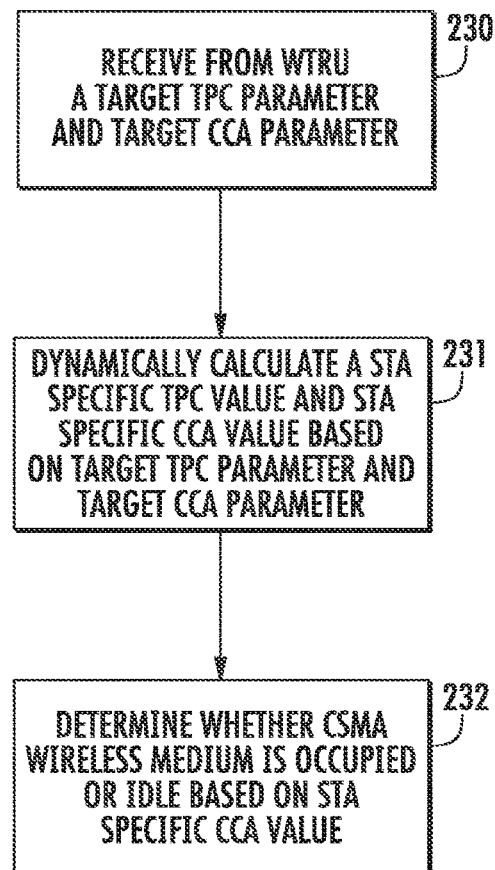
FIG. 2C is a flow chart of another example procedure for controlling TPC and CCA for a plurality of STAs operating in a BSS.

FIG. 2C is a flow chart of another example procedure for controlling TPC and CCA for a plurality of STAs operating in a BSS in accordance with the first embodiment, which may be used in combination with any of the embodiments described herein. The procedure of FIG. 2C is implemented in a STA operating in an IEEE 802.11 BSS for exemplary purposes, but it may also be implemented in a WTRU, AP, base station, UE, or any other wireless communications device capable of operating in a wireless communications network. In this example, the STA may receive 230 from a WTRU a target TPC parameter and a target CCA parameter. The target TPC parameter may be the TPC_target described above. The target CCA parameter may be a CCA threshold, for example.

The WTRU in this example may be an IEEE 802.11 cluster head configured to control TPC and CCA for a plurality of STAs associated with a BSS. The target TPC parameter and the received target CCA parameter from the cluster head may, for example, be based on information received at the cluster head from a neighboring BSS.

The STA may then dynamically calculate 231 a STA specific TPC value and a STA specific CCA value based on the target TPC parameter and the target CCA parameter. For example, the STA specific TPC value and the STA specific CCA value may be based on both the target TPC parameter and the target CCA parameter. Alternatively, the STA specific TPC value may be based only on the target TPC parameter, and the STA specific CCA value may be based only on the target CCA parameter.

The STA may then determine 232 whether the CSMA wireless medium of the WLAN BSS is occupied or idle based on the STA specific CCA value.

Figure 3:
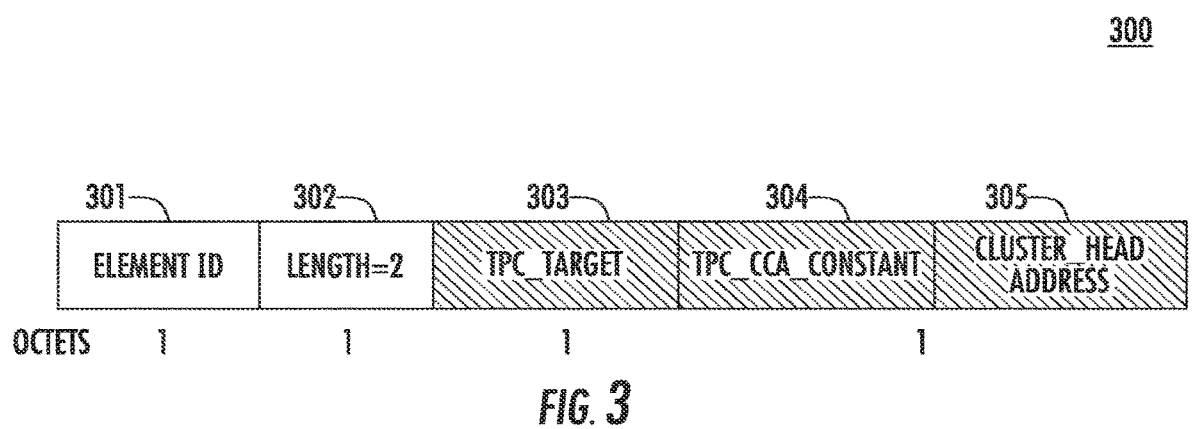
FIG. 3 is an example of a CCA Modification Element.

FIG. 3 is a diagram of an example CCA modification element 300 which as described above may be used by a parameter estimator, cluster head, or cluster head WTRU to signal network parameters. The WTRU or cluster head may transmit this CCA modification element frame aggregated to a beacon, as part of a beacon frame, or as a separate frame. The CCA modification element 300 may include an element ID 301, length 302, TPC_target 303, TPC_CCA_constant 304, and cluster_head address 305.

Figure 4:
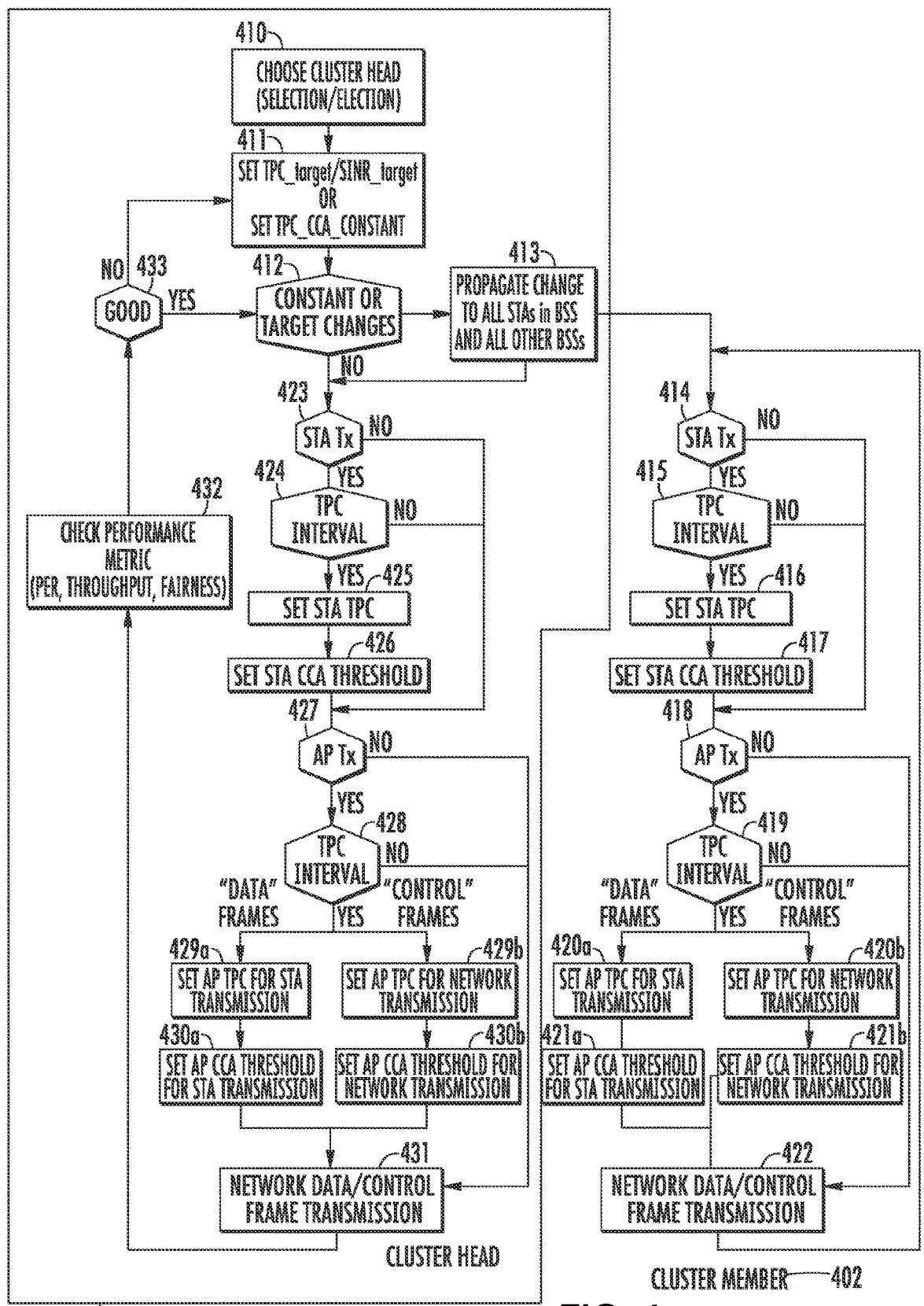
FIG. 4 is an example of one procedure for TPC and CCA adaptation.

FIG. 4 is a diagram of another example procedure 400 for using a common transmit power and a corresponding common CCA threshold to maximize performance of the network. Note that in this example the CCA and TPC parameters may be based on whether the frame type is a control frame that may be transmitted to a plurality of destinations or data frame that may be transmitted to a single destination.

Referring to FIG. 4, cluster head 401 may have been chosen/elected 410 to function as the cluster head and then may set a TPC_target/SINR_target and/or TPC_CCA_constant 411 and may then determine if the constant or target needs to change or not 412. If there are changes, cluster head 401 may then propagate the changes to all STAs in the BSS and other BSSs 413. Cluster member 402 may then set a STA TPC 416 and STA CCA threshold 417 when a STA is transmitting 414 and when the time interval for updating TPC or CCA 415 has expired. Cluster member 402 may then set an AP TPC 420a for data frames and an AP TPC 420b for control frames. Similarly, cluster member 402 may set an AP CCA threshold 421a for data frames and an AP CCA threshold 421b for control frames, when an AP is transmitting 418 and when the time interval for updating TPC or CCA 419 has expired. Otherwise network data/control frame transmission proceeds 422.

Cluster head 401 may also set a STA TPC 425 and STA CCA threshold 426 when a STA is transmitting 423 and when the time interval for updating TPC or CCA 424 has expired. Cluster head 401 may then set an AP TPC 429a for data frames and may set an AP TPC 429b for control frames. Similarly, cluster head 401 may set an AP CCA threshold 430a for data frames and an AP CCA threshold 430b for control frames, when an AP is transmitting 427 and when the time interval for updating TPC or CCA 428 has expired. Otherwise network data/control frame transmission proceeds 431. Cluster head 401 also checks performance metrics 432 such as PER, throughput, and fairness and determines whether they are good 433 or should be reset.

Figure 5:
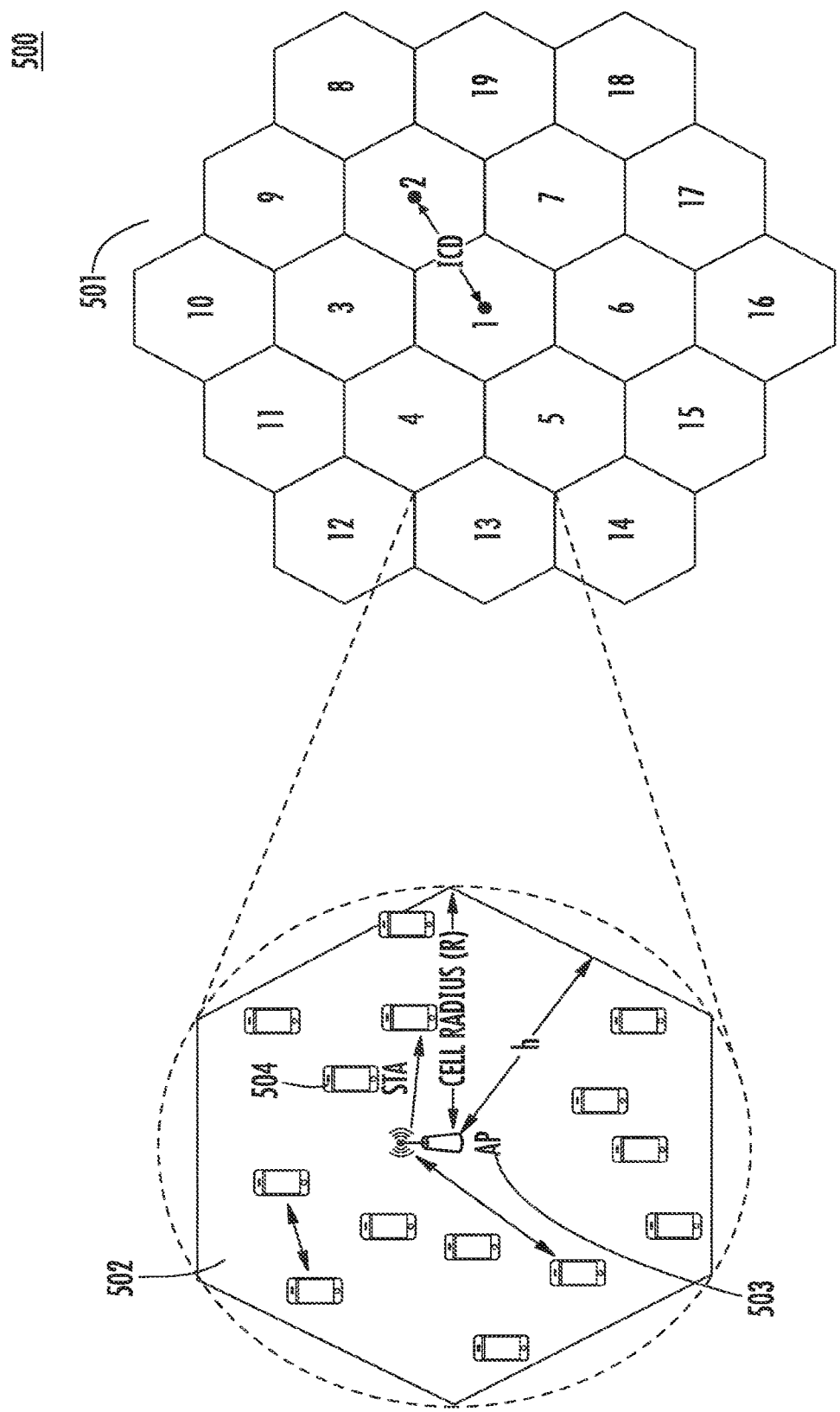
FIG. 5 is an illustration of a Dense Indoor Hotspot.

FIG. 5 is a diagram of a dense indoor hotspot 500 depicting an environment that may implement any of the procedures described herein. Each hotspot 502 may include an AP 503 and a plurality of STAs 504. The benefits of the methods described herein may be simulated using the dense indoor hotspot depicted in FIG. 5. Such a simulation may use the parameters of TABLE 1.

TABLE 1

| PARAMETER | VALUE |
| --- | --- |
| Network | 19 Hexagonal APs with 30 STAs Each |
| Inter-AP Spacing | 15 m |
| AP Max Tx power | 17 dBm |
| AP Height | 4 m |
| Frequency Reuse | 1 |
| Max STA Power | 17 dBm |
| Channel | Channel E (indoor) |
| Antenna | Omnidirectional |
| AMC | Adaptive Automatic Rate Fallback (AARF) |
| RTS/CTS | OFF |
| TxGain and RxGain | 0.0 dB |
| CCA Threshold | −82 dBm |
| Energy Detection Threshold/Rx Sensitivity | −81 dBm |
| Traffic | Uplink, Downlink, bi-directional (50%-50%) |
| Target Receive TPC Power | −85 dBm |
| Energy Model | Wifi Radio Energy Model |
| TPC/CCA Adaptation Update Interval | Every Packet |

TABLE 2 shows the MAC throughput and the number of STAs that are able to successfully transmit, in an uplink transmission, for the following scenarios: No TPC (Line 2 and Line 3); TPC On with no CCA Adaptation (Line 4 and Line 5); TPC On with CCA Adapation (Lines 6, 7 and 8 or Line 9, 10 and 11) for a different TPC_CCA Target.

TABLE 2

| | | | | | | | | | |
| --- | --- | --- | --- | --- | --- | --- | --- | --- | --- |
| 1 | | TPC Target | −80 | −75 | −70 | −65 | −60 | −55 | −50 | −45 |
| 2 | No TPC | Mac throughput | 0 | 0 | 0 | 0 | 0 | 0 | 0 | 0 |
| 3 | | Number of STAs | 0 | 0 | 0 | 0 | 0 | 0 | 0 | 0 |
| 4 | TPC on/CCA Adaptation off | Mac throughput | 120 | 388 | 639 | 647 | 390 | 993 | 929 | 520 |
| 5 | | Number of STAs | 3 | 9 | 10 | 11 | 6 | 13 | 12 | 7 |
| 6 | TPC on/CCA Adaptation on | Mac throughput | 222 | 281 | 555 | 624 | 845 | 905 | 967 | 891 |
| 7 | | Number of STAs | 13 | 11 | 12 | 10 | 15 | 21 | 17 | 17 |
| 8 | | TPC_CCA_target | −70 | −60 | −45 | −55 | −75 | −65 | −70 | −70 |
| 9 | | Mac throughput | | | | | | | 954 | 1017 |
| 10 | | Number of STAs | | | | | | | 12 | 12 |
| 11 | | TPC_CCA_target | | | | | | | −60 | −65 |

In an uplink transmission, as illustrated in TABLE 2, throughput improves with TPC on but with CCA adaptation off, with the best performance at a TPC target of −55 dB (993 kbps). However, only 13 STAs are able to successfully transmit. With CCA adaptation on, it is possible to trade off throughput and fairness. With a TPC target of −55 dB, network throughput may be increased to 905 kbps with 21 STAs transmitting. Alternatively, with a TPC target of −50 dB, network throughput may be increased to 1017 kbps with 12 STAs transmitting.

Similar trade-offs are illustrated in TABLE 3 and TABLE 4 below.

TABLE 3 shows the MAC throughput and number of STAs that are able to successfully transmit, in a downlink transmission, for the following scenarios: No TPC (Line 2 and Line 3); TPC On with no CCA Adaptation (Line 4 and Line 5); TPC On with CCA Adaptation (Lines 6, 7 and 8 or Line 9, 10 and 11) for a different TPC_CCA Target.

TABLE 3

| 1 | | TPC Target | −80 | −75 | −70 | −65 | −60 | −55 |
|---|---|---|---|---|---|---|---|---|
| 2 | No TPC | Mac throughput | 494.16 | 494.16 | 494.16 | 494.1 | 494.1 | 494.16 |
| 3 | | Number of STAs | 23 | 23 | 23 | 23 | 23 | 23 |
| 4 | TPC on/CCA Adaptation off | Mac throughput | 330.16 | 540.33 | 485.77 | 488.8 | 432.3 | 520.01 |
| 5 | | Number of STAs | 11 | 19 | 23 | 21 | 18 | 18 |
| 6 | TPC on/CCA Adaptation on | Mac throughput | 365.6 | 530.72 | 523.20 | 541 | 484.1 | 520.01 |
| 7 | | Number of STAs | 27 | 23 | 26 | 19 | 22 | 18 |
| 8 | | TPC_CCA_target | −80 | −70 | −80 | −65 | −70 | −65 |
| 9 | | Mac throughput | | 504 | 572.17 | 463 | 512.7 | |
| 10 | | Number of STAs | | 26 | 22 | 22 | 19 | |
| 11 | | TPC_CCA_target | | −75 | −60 | −70 | −50 | |

TABLE 4 shows the MAC throughput and number of STAs that are able to successfully transmit, in bi-directional transmission, for the following scenarios: No TPC (Line 2 and Line 3); TPC On with no CCA Adaptation (Line 4 and Line 5); TPC On with CCA Adaptation (Lines 6, 7 and 8 or Line 9, 10 and 11) for a different TPC_CCA Target.

TABLE 4

| 1 | | TPC Target | −80 | −65 |
|---|---|---|---|---|
| 2 | No TPC | Mac throughput | 305 | 305 |
| 3 | | Number of STAs | 7 | 7 |
| 4 | TPC on/CCA Adaptation off | Mac throughput | 19.76 | 378 |
| 5 | | Number of STAs | 2 | 8 |
| 6 | TPC on/CCA Adaptation on | Mac throughput | 226.05 | 632.8 |
| 7 | | Number of STAs | 24 | 17 |
| 8 | | TPC_CCA_target | −80 | −60 |

Figure 6:
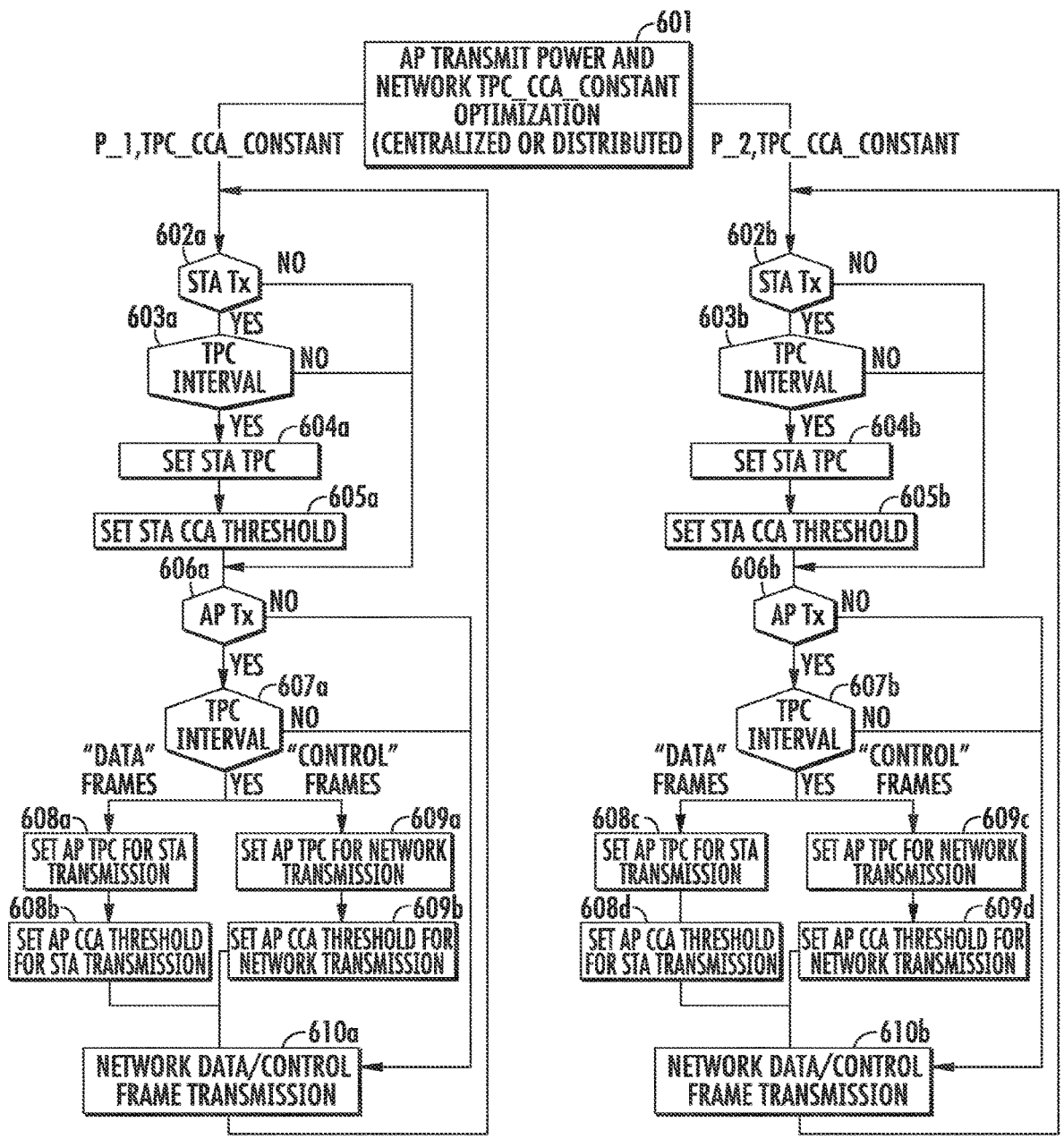
FIG. 6 is an example of one procedure for TPC and CCA adaptation based on distributed optimization.

FIG. 6 is a diagram of an example procedure 600 wherein a CCA threshold may be adapted in the network with a utility function based TPC in accordance with a second embodiment, which may be used in combination with any of the other embodiments described herein. In this embodiment, the sum in the logarithmic domain (or equivalently the product in the linear domain) of the optimal power transmit level and CCA_threshold for each BSS is assumed to be a constant:

$$P + CCA\_threshold = TPC\_CCA\_constant \text{ (in dB)} \quad \text{Equation (16)}$$

where P may be the transmit power and CCA_threshold may be the CCA threshold used by the node (AP or STA).

The AP transmit power needed in each BSS and the TPC_CCA_constant for the entire network may be estimated based on minimizing a utility function derived from the deployment of BSSs in the network, the distribution of STAs in each BSS, and the maximum transmit power allowed for each AP. Optimization may estimate the transmit power of each BSS relative to all the other BSSs in the network. An additional constraint based on the maximum transmit power allowed for each BSS may enable estimation of the absolute transmit power to be used for each AP.

This maximum transmit power constraint may be adapted or adjusted for further improvement in performance. For example, in a network that has a maximum transmit power of 17 dBm and with AP1 to AP2 power at 2:1, AP1 may set its power to 17 dBm, and AP2 may set it power to 14 dBm. The transmit power may be adjusted by instructing all the APs in the network to reduce their power by a desired amount to keep the relative transmit powers constant. Once the transmit powers for each AP have been estimated, each AP may use this value to estimate its TPC_target based on the transmit power and the path loss to the farthest STA. Using the estimated TPC_target and the network wide TPC_CCA_constant, the transmit power and CCA thresholds for all STAs in the BSS may be estimated.

In this embodiment, the TPC_CCA_constant may be adapted using methods described in any of the other embodiments disclosed herein. However, the TPC target may also be derived from an inter-BSS estimation of the optimal transmit power for each BSS. The procedure is disclosed herein.

Referring to FIG. 6, the AP transmit power for each AP/BSS in the entire network and optimal TPC_CCA_target may be estimated 601. This may be implemented by a distributed optimization of a desired utility function. An example of a suitable utility function may include minimizing the potential delay in the network. The delay for each BSS may be approximated by the inverse of the average throughput per BSS. The average throughput of the network may be estimated by the harmonic mean, which is the reciprocal of the arithmetic mean of the reciprocal of the data values, of the throughput of a desired subset of STAs. The STAs used in the estimation may be all the STAs in the BSS or the edge STAs. The harmonic mean may be used in scenarios involving rates, as it may provide the most suitable average. In a CSMA/CA network, this average throughput of a specific BSS depends on the probability that the BSS is able to transmit in the medium while competing with other BSSs/APs. This may be represented as prob(access_AP_i). For each AP i with U users, the average throughput may be estimated by $$prob(\text{access\_AP\_i}) \frac{1}{\left(\frac{1}{U_i} \sum \frac{1}{\log 2(1 + SNR_{u,i})}\right)} \quad \text{Equation (17)}$$

The delay may be estimated as:

$$\frac{1}{prob(\text{access\_AP\_i})}\left(\frac{1}{U_i}\sum\frac{1}{\log 2(1+SNR_{u,i})}\right) \quad \text{Equation (18)}$$

where $U_i$ may be the number of STAs in AP_i used to estimate the power, $SNR_{u,i}$ may be the effective SNR of STA U in AP_i, and prob(access_AP_i) may be the probability that there is transmission in AP_i given transmission in other APs. The utility function to minimize may be the sum of delays over the entire network $$\sum_{ALL\ APs}\frac{1}{prob(\text{access\_AP\_i})}\left(\frac{1}{U_i}\sum\frac{1}{\log 2(1+SNR_{u,i})}\right) \quad \text{Equation (19)}$$

Assuming that C_i may be the CCA_threshold for AP_i, P_i may be the transmit power, K may be the TPC_CCA_constant and g_i may be the gain from the AP to each STA, then $$SNR_{u,i} = \frac{P_i g_i}{\alpha g_i C_i + N_o} \approx \frac{P_i g_i}{\alpha C_i} \quad \text{Equation (20)}$$

where $$\alpha = \frac{1}{g_i}$$

assumes that the interference at the serving AP is approximately equal to the interference at the STA, and $\alpha = g_i \cdot$(mean distance from closest APs) assumes that the interference at the STA is estimated based on the interference from the serving AP and the closest interfering APs. The probability of AP access may be estimated as $$prob(\text{access}_{AP_i}) = \frac{1}{1 + \sum_{closes\ interfering\ APs}\frac{P_i d_{ij}}{C_j}} \quad \text{Equation (21)}$$

which indicates that the probability of an AP interfering may be based on the relationship between the transmit power of the AP in question, the distance between the two APs, and the CCA threshold of the interfering AP. As the probability trends to zero, the probability of access of AP i increases. Thus the network utility function and corresponding constraints becomes $$\min_{K,C,P}\sum_{All\ APs}\left(1+\sum_{closes\ tinterfering\ APs}\frac{P_i d_{ij}}{C_j}\right) \quad \text{Equation (22)}$$

$$\left(\frac{1}{U_i}\sum\frac{1}{\log 2\left(1+\frac{P_i g_i}{\alpha g_i C_i + N_o}\right)}\right)$$

s.t. $P_i \leq P_{max}$; $P_i C_i = K$, $\alpha g_i C_i \gg N_o$

This optimization may be performed successively and independently per cell with CCA information, C_j, from the neighboring cells and C_j_min information indicating the minimum CCA in the network. For example in a 3 cell network, cell 1 may perform its optimization based on its local utility and may pass information to cell 2. Cell 2 may perform its optimization based on its local utility and may pass information to cell 3. Cell 3 may perform its optimization based on its local utility and may pass information to cell 1. This process may continue for a desired duration. The information that may be passed between cells may include, but is not limited to, a ratio of the CCA_threshold calculated to the TPC_CCA_constant for the current cell, or the minimum value of the ratio of the CCA_threshold calculated to the TPC_CCA_constant for any overheard cell. Based on this optimization, all the BSSs may be able to estimate the best AP power for each BSS in the network.

Based on the transmit power estimated, AP_i may then estimate the desired TPC target for all STAs in the network using the worst case STA as a reference. AP_i may send this information to all the STAs in the network, for example by using the beacon. The AP may also send the estimated NW_target for CCA_adaptation, that is, the TPC_CCA_constant. The constant may be based on the optimization of the utility function or may be based on nominal values from the specification. STA_i in BSS_i may estimate the transmit power needed. For example, $$P\_i + \text{Path\_shadow\_fading\_loss} = \text{TPC\_target}. \quad \text{Equation (23)}$$

STA_i in BSS_j may estimate its new CCA threshold:

$$\text{CCA\_threshold\_}i = \text{TPC\_CCA\_constant} - P\_i \quad \text{Equation (24)}$$

AP_i may also estimate additional TPCs to other STAs (for STA specific transmission). The network may at desired intervals instruct all the APs to increase or reduce their transmit powers by a desired amount ensuring that the relative transmit powers stay constant while obeying the maximum transmit power constraint. The network may at desired intervals update TPC_CCA_constant to obtain the best parameters for the network. In the specific example of FIG. 6, this is shown as setting STAs TPCs 604a and 604b and STA CCA threshold 605a and 605b when a STA is transmitting 602a and 602b and when the time interval for updating TPC 603a and 603b has expired.

Also, note that in this example the CCA and TPC parameters may be based on whether the frame type is a control frame that may be transmitted to a plurality of destinations or data frame that may be transmitted to a single destination. Referring to FIG. 6, an APs TPCs 608a and 608c may be set for data frames, and APs TPCs 609a and 609c may be set for control frames. Similarly, AP CCA thresholds 608b and 608d may be set for data frames, and AP CCA thresholds 609b and 609d for control frames, when an AP is transmitting 606a and 606b and when the time interval for updating TPC 607a and 607b have expired. Otherwise network data/control frame transmission proceeds 610a and 610b.

CCA may also be adapted with generalized transmit power control in accordance with a third embodiment, which may be used in combination with any of the embodiments described herein. Though CCA adaptation is commonly concurrent with TPC, TPC and CCA may be independent processes. CCA adaptation may be applied with explicit TPC. The TPC level for a particular STA, at time t, on a particular channel, may be determined using the following hash function:

TPC(STA_ID,t,channel)=hash(AP_STA_separation,
 STA_Group,STA_class,STA_max_power,
 BSS_schedule,channel) Equation (25)

where it may be removed if the TPC assignment is static. The channel may be removed if the TPC is for only one channel or the same for all channels. Although a hash function in this example, it is understood that other functions may be used with one or more of the same input parameters to determine the TPC for a particular STA, at time t, on a particular channel.

Other variables in Equation (25) may be defined as follows:

(1) AP_STA_separation: This parameter indicates the separation between the AP and the STA for which the TPC is being determined. The separation may be the distance between the STA and the AP; it may also be attenuation of the channel between the AP and the STA, which may be determined using the CCA margin/TPC feedback provided by the STAs.

(2) STA_Group: the group to which the STA belongs. Such a group of STAs may be a group of STAs that have concurrent access to the wireless medium by allocating orthogonal resources to each of the group STA, such as a MU-MIMO (Multi-User MIMO) group, or a OFDMA group which allocates a part of the frequency resources to each of the group STA, or a group of STAs that are allowed access to the medium in a beacon subinterval using either contention-free or contention-based method. By setting the TPC level to 0 or a pre-defined value for some group of STAs for a certain interval may imply that the STAs are not allowed to access the medium during that interval.

(3) STA_Class: the class of the STA, including, but not limited to: sensors, meters, Fast Initial Link Setup (FILS) STAs, HEW STAs, VHSE STAs, STAs with limited power, STAs with plugged in power source. The class of STAs may have direct impact on its TPC levels; e.g., STAs with limited power may not be set to a very high TPC power level.

(4) STA_max_power: This parameter may be the maximal TPC level that the STA may be capable of, which may be supplied by the STA to the AP during the association process or at another point of time. The TPC level set for a particular STA may not exceed the STA_max_power.

(5) BSS_schedule: this parameter is related to the overall BSS schedule, such as that for a certain interval, the BSS may stay quiet for measurement, for radar detections or for interference measurements. Alternatively, some STAs may be allowed to access the medium during some beacon subinterval, while other STAs may not be allowed to access the medium during the same beacon intervals. The TPC levels for the different group of STAs may be different depending on the BSS schedule.

(6) Channel: For a given STA, the TPC on different channels may be different, depending on the locations of the primary channels, secondary channels, secondary 40 MHz channels, secondary 80 MHz channels, or on different channels of Selective Subchannel Transmissions or different resource blocks.

The CCA level for a particular STA, at time t, on a particular channel, may be determined using the following hash function:

$$\text{CCA\_Level}(STA\_ID, t, \text{channel}) = \text{hash}(\text{TPC}(STA\_ID, t, \text{channel}), AP\_STA\_separation, STA\_Group, STA\_class, STA\_max\_CCA, STA\_min\_CCA, STA\_CCA\_resolution, BSS\_schedule, \text{channel}) \quad \text{Equation (26)}$$

t may be removed from the above if the CCA level assignment is static. The channel may be removed from the above if the CCA level may be for only one channel or the same for all channels. Although a hash function was used in the above formula, it is understood that other functions may be used with one or more of the same input parameters to determine the CCA level for a particular STA, at time t, on a particular channel.

Other variables in Equation (26) may be defined as follows:

(1) TPC(STA_ID, t, channel): the TPC level determined for the STA at time t on the channel. The CCA level may be set to correlate with the TPC level assigned to the STA; when a STA transmits using a lower power at time t on a particular channel, it may need to set its CCA level to a lower value in order to ensure that the transmissions may be correctly received by the receiving STA.

(2) AP_STA_separation: This parameter indicates the separation between the AP and the STA for which the TPC is being determined. The separation may be the distance between the STA and the AP; it may also be attenuation of the channel between the AP and the STA, which may be determined using the CCA margin/TPC feedback provided by the STAs.

(3) STA_Group: the group to which the STA belongs. Such a group of STAs may be a group of STAs that have concurrent access to the wireless medium by allocating orthogonal resources to each of the group STA, such as a MU-MIMO (Multi-User MIMO) group, or a OFDMA group which allocates a part of the frequency resources to each of the group STA, or a group of STAs that are allowed access to the medium in a beacon subinterval using either contention-free or contention-based method. By setting the CCA level to different values for different groups of STAs for a certain interval may provide differentiated priorities for medium access for the groups of STAs.

(4) STA_Class: the class of the STA, including, but not limited to sensors, meters, Fast Initial Link Setup (FILS) STAs, HEW STAs, VHSE STAs, STAs with limited power, STAs with plugged in power source.

(5) STA_max_CCA: This parameter may be the maximal CCA level that the STA is capable of, which may be supplied by the STA to the AP during the association process or at another point of time. The CCA level set for a particular STA may not exceed the STA_max_CCA.

(6) STA_min_CCA: This parameter may be the minimal CCA level that the STA is capable of, which may be supplied by the STA to the AP during the association process or at another point of time. The CCA level set for a particular STA may not be lower than the STA_min_CCA.

(7) STA_CCA_Resolution: the resolution by which the STA may adjust its CCA level.

(8) BSS_schedule: this parameter is related to the overall BSS schedule, such as that for a certain interval, the BSS may stay quiet for measurement, for radar detections or for interference measurements.

(9) Channel: For a given STA, the CCA on different channels may be different, depending on the locations of the primary channels, secondary channels, secondary 40 MHz channels, secondary 80 MHz channels, or on different channels of Selective Subchannel Transmissions or different resource blocks.

FIG. 7 shows an example diagram of an Extended Power Capability Element 700, which may be used by a STA to provide its TPC and CCA capabilities in accordance with any of the embodiments described herein. An Extended Power Capability Element 700 may contain an Element ID field 701, which may be the field that identifies that the current element is the Extended Power Capability Element. An Extended Power Capability Element 700 may also contain a Length field 702, which may be the length of the Extended Power Capability Element 700. An Extended Power Capability Element 700 may contain a TPC Capabilities field 703, which may contain a field or fields from an existing Power Capability Element such as the STA_Max_Power and STA_Min_Power fields. In addition, the TPC Capabilities field 703 may also contain a STA_Power_Resolution field, which may be the resolution at which the STA may adjust its TPC. An Extended Power Capability Element 700 may also contain a CCA Capabilities field 704, which may contain the various parameters related to the STA's CCA capabilities, such as the STA_max_CCA, STA_min_CCA, and STA_CCA_Resolution parameters.

Figure 8:
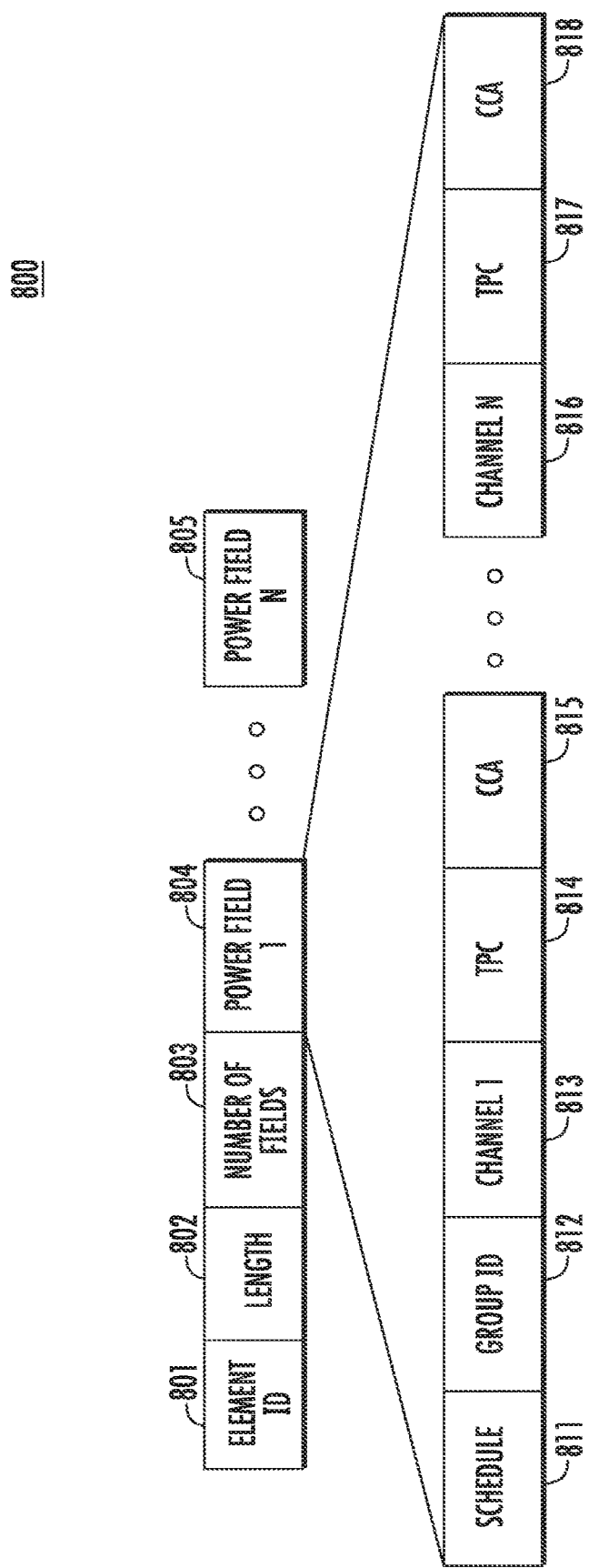
FIG. 8 is an illustration of an example design of a Power Announcement Element.

FIG. 8 is a diagram of an example of a Power Announcement Element 800, which may be used by an AP to announce the TPC and CCA assignment for its BSS and/or for a particular STA or a group of STAs in accordance with any of the embodiments described herein. A Power Announcement Element 800 may contain an Element ID field 801. The Element ID field 801 may be a field that identifies that the current element is the Power Announcement Element 800. A Power Announcement Element 800 may also contain a Length field 802, which may be the length of the Power Announcement Element 800. A Power Announcement Element 800 may also contain a Number of Fields field 803, which may indicate the number of Power Fields contained in the current element. A Power Announcement Element 800 may also contain the field Power Field 1 804 to Power Field N 805.

Each Power Field may contain the TPC and CCA settings for a period of time and or for a group of STAs. Additionally, each Power Field may contain a Schedule 811, which may be the schedule for which the current Power Field is valid. The schedule may be specified to be periodic or one time with a starting time, duration, and repeating frequency. If the TPC and CCA settings are valid for all time, the Schedule 811 subfield may be omitted or set to a specific value.

Each Power Field may also contain a Group ID 812. The Group ID 812 may specify which group of STAs for which the TPC and CCA settings are valid. If the TPC and CCA settings are for the entire BSS, then the Group ID 812 subfield may be omitted or set to a specific value such as "0". The Group ID field may be set to a MAC address or AID or omitted if the TPC and CCA setting are for one particular STA.

Each Power Field also may contain one or more Channel 813 and 816 subfields. The TPC 814 and 817 values and the CCA 815 and 818 settings may be specified for each Channel, such as a primary 20 MHz channel, secondary 20 MHz channel, secondary 40 MHz channel, secondary 80 MHz, or for a specific resource block, such as a group of subcarriers, a spatial channel in a MU-MIMO transmissions, or a channel in Selective Subchannel transmissions.

The Extended Power Capability Element 700 and the Power Announcement Element 800 or any subset of the fields or subfields thereof may be implemented as a field or subfield or subsets of fields and/or subfields of any existing or new IE, such as but not limited to the S1GNHSE/HEW Capability Element, S1GNHSE/HEW Extended Capability, S1GNHSE/HEW Operation Element, S1GNHSE/HEW Power Element, or as a part of any NDP, control, management, extension frames or MAC/PLCP headers.

The STAs may indicate their Power and CCA capabilities using the Extended Power Capability Element defined above in a Probe Request, (Re)Association Request frames or any other type of frames. A STA may only transmit Probe Request or (Re)Association Request frames to APs which have indicated compatible Power and CCA settings which may be included in the beacons, or any other type of NDP, management, control or extension frames.

An AP may indicate its Power and CCA capabilities using the Extended Power Capability Element in its beacon or any other type of NDP, management, control or extension frames. When an AP receives a Probe Request, (Re)Association Request frames containing the Extended Power Capability Element, an AP may determine whether to reply with a Probe Response frame or to allow the (Re)Association on the basis whether the requesting STA has the appropriate TPC and CCA capabilities. The AP may determine the TPC and CCA settings for one or more STAs (such as a group of STAs or the entire BSS) using the hash functions as disclosed herein.

The AP may include a Power Announcement Element in the Probe Response or (Re)Association Response, or beacon, short beacon, or any management, control or extension frame, to the STA to instruct the STA to set its TPC and CCA to the correct levels according to the schedules and for the different channels or resource blocks as specified.

The AP may group STAs into a group and may send TPC and CCA settings for the different groups of STAs by including the Power Announcement Element in a unicast, multicast or broadcast frames such as NDP, beacon, short beacons or other management, control or extension frames. The STAs may adjust their TPC and CCA settings according to the Power Announcement Element received from the AP in frames such as beacon, short beacons or other management, control or extension frames.

Figure 9:
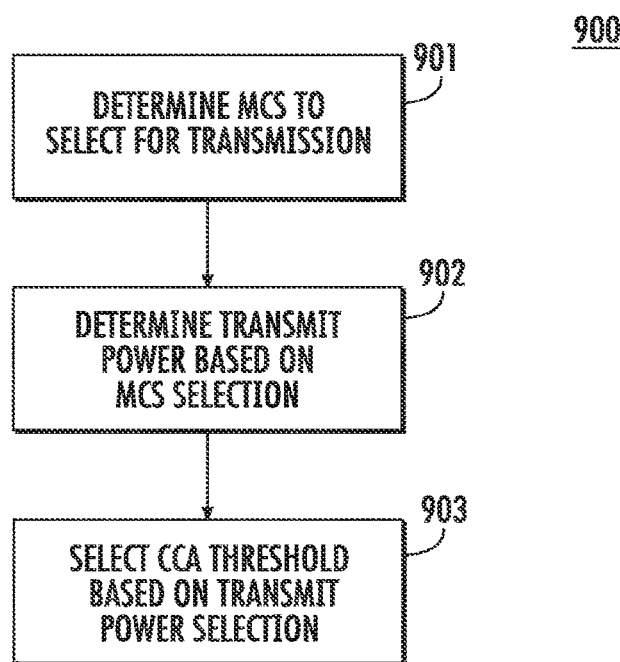
FIG. 9 is a flow diagram of an example procedure for CCA threshold adaptation being made MCS-dependent.

FIG. 9 is a flow diagram of an example procedure for CCA threshold adaptation being made MCS-dependent 900, in accordance with a fourth embodiment, which may be used in combination with any of the other embodiments described herein. In particular, P_tx may be the actual transmit power to be used for an upcoming transmission (MCS dependent), P_nominal may be a nominal transmit power for an upcoming transmission (MCS independent), CCA_threshold may be the clear channel assessment threshold to be used by the transmitter before transmission, MCS may be the proposed modulation and coding selection, for example, by the receiver. The transmitter may choose $$P\_tx * CCA\_threshold = V(MCS) \quad \text{Equation (27)}$$

where the variable V is a MCS-dependent variable.

Referring to FIG. 9, the transmitter may determine the MCS to be used for transmission to the desired receiver 901. Obtaining the proper MCS may be done implicitly at the transmitter side by measuring the reciprocal channel from the desired receiver. Alternatively, obtaining the proper MCS may be done explicitly at the transmitter side by a signaling exchange between the transmitter and the desired receiver.

The transmitter may then select the transmit power based on the proper MCS selection 902. For different MCSs, the transmit power may be dependent on the MCS. A larger MCS may be more sensitive to various channel impairments than a smaller MCS. Thus, a larger transmit power margin may be applied when a larger MCS is used, and a smaller transmit power margin may be applied when a smaller MCS is used in accordance with the following:

$$P\_tx = P\_nominal + \delta P(MCS). \quad \text{Equation (28)}$$

The actual transmit power may have two components, P_nominal, which may be independent of the used MCS, and δP(MCS), which may be dependent on the used MCS.

The transmitter may then select the CCA threshold based on the proper transmit power selection 903. In one example, P_tx*CCA_threshold may be a constant. However, transmit power selection may depend on other parameters, for example, MCS. CCA_threshold may be used to detect nearby networks and may be independent of the MCS selection. Thus, having P_tx*CCA_threshold as a constant may not be desirable in some circumstances. In another example, P_nominal*CCA_threshold may be a constant, while the actual transmit power may differ from the P_nominal by a MCS-dependent margin in accordance with the following:

$$CCA\_threshold = constant / P\_nominal = constant / (P\_tx - \delta P(MCS)) \quad \text{Equation (29)}$$

FIG. 10 is a flow diagram for an example procedure 1000 for TPC/CCA adaptation such that all STAs within the same BSS use a common transmit power and/or a common CCA threshold in accordance with a fifth embodiment, which may be used in combination with any of the embodiments described herein. In this example, each communication link may have a separate transmit power, and CCA threshold from others. Nominally, the transmit power may be determined based on the transmitter-receiver distance, while the CCA threshold may be determined later.

The AP may collect the minimum CCA capability from each STA 1001. For example, 50 STAs within the same BSS may have 50 different minimum CCA thresholds. The AP may also collect the transmit power control capability from each STA 1002. For example, 50 STAs within the same BSS may have 50 different maximum transmit powers. The AP may determine a common CCA threshold for each STA within the same BSS 1003. The common CCA threshold may be the largest CCA threshold across all STAs. The AP may then determine a common transmit power for each STA within the same BSS 1004. This common transmit power may be used by each STA as its own nominal transmit power. The AP may then broadcast the common CCA threshold and the common transmit power to all STAs, for example, within the beacon 1005. Upon receiving the beacon signal from the AP, each STA may use the new common CCA threshold as its own CCA in the future, and each STA may use the new transmit power as its own transmit power in the future 1006.

It is noted that the CCA threshold used by all the STAs with the same BSS may be different from the CCA threshold used by the AP in the same BSS, i.e. uplink CCA threshold may be different from downlink CCA threshold. Similarly, the transmit power used by all the STAs within the same BSS may be different from the transmit power used by the AP in the same BSS.

Although the features and elements described herein consider 802.11 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in an access point (AP) associated with a first Basic Service Set (BSS), the method comprising:
   transmitting, to an IEEE 802.11 station (STA) associated with the first BSS, a Clear Channel Assessment (CCA) value for a group of STAs associated with a second BSS, the CCA value indicating a minimum CCA threshold for a packet received from the second BSS; and
   receiving, from the IEEE 802.11 STA, a signal at a transmit power adjusted based on a target transmit power control (TPC) parameter of the IEEE 802.11 STA,
   wherein the target TPC parameter is determined based on the CCA value, a STA specific CCA parameter and a target CCA parameter, the target CCA parameter being greater than the STA specific CCA parameter.

2. The method of claim 1, wherein a sum of the target TPC parameter and the STA specific CCA parameter is constant.

3. The method of claim 1, wherein the adjusted transmit power is less than or equal to a maximum transmit power of the IEEE 802.11 STA.

4. The method of claim 1, wherein the STA specific CCA parameter indicates a CCA threshold for a packet received from the group of STAs associated with the second BSS.

5. The method of claim 1, wherein the CCA value for the group of STAs associated with the second BSS is a minimum value of a ratio of a CCA threshold.

6. The method of claim 1, wherein the AP is an IEEE 802.11 cluster head configured to control TPC and CCA for a plurality of STAs associated with the first BSS.

7. The method of claim 1, wherein the CCA value is determined based on a baseline transmit power and a CCA threshold permitted in the first BSS.

8. The method of claim 1, wherein the STA specific CCA parameter is less than a maximum CCA threshold.

9. An access point (AP) associated with a first Basic Service Set (BSS), the AP comprising:
   a transmitter configured to transmit, to an IEEE 802.11 station (STA) associated with the first BSS, a Clear Channel Assessment (CCA) value for a group of STAs associated with a second BSS, the CCA value indicating a minimum CCA threshold for a packet received from the second BSS; and
   a receiver configured to receive, from the IEEE 802.11 STA, a signal at a transmit power adjusted based on a target transmit power control (TPC) parameter of the IEEE 802.11 STA, wherein the target TPC parameter is determined based on the CCA value, a STA specific CCA parameter and a target CCA parameter, the target CCA parameter being greater than the STA specific CCA parameter.

10. The AP of claim 9, wherein a sum of the target TPC parameter and the STA specific CCA parameter is constant.

11. The AP of claim 9, wherein the adjusted transmit power is less than or equal to a maximum transmit power of the IEEE 802.11 STA.

12. The AP of claim 9, wherein the STA specific CCA parameter indicates a CCA threshold for a packet received from the group of STAs associated with the second BSS.

13. The AP of claim 9, wherein the CCA value for the group of STAs associated with the second BSS is a minimum value of a ratio of a CCA threshold.

14. The AP of claim 9, wherein the AP is an IEEE 802.11 cluster head configured to control TPC and CCA for a plurality of STAs associated with the first BSS.

15. The AP of claim 9, wherein the CCA value is determined based on a baseline transmit power and a CCA threshold permitted in the first BSS.

16. The AP of claim 9, wherein the STA specific CCA parameter is less than a maximum CCA threshold.

* * * * *